United States Patent
Tvaroh et al.

(10) Patent No.: US 10,346,807 B2
(45) Date of Patent: Jul. 9, 2019

(54) WORKPLACE MOVEMENT VISUALIZATIONS

(71) Applicant: Accenture Global Solutions Limited, Dublin (IE)

(72) Inventors: Scott Tvaroh, Glenview, IL (US); Rajesh Ramamurthi, Cranbury, NJ (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/043,966

(22) Filed: Feb. 15, 2016

(65) Prior Publication Data

US 2017/0236096 A1    Aug. 17, 2017

(51) Int. Cl.
*G06Q 10/10* (2012.01)
*G06F 3/0484* (2013.01)
*H04W 4/021* (2018.01)

(52) U.S. Cl.
CPC ....... *G06Q 10/1091* (2013.01); *G06F 3/0484* (2013.01); *H04W 4/021* (2013.01)

(58) Field of Classification Search
CPC ........... G06Q 10/083; G06Q 10/06398; G06Q 10/109; G06Q 10/063114; G06Q 10/06; G06Q 30/1091; G06Q 30/0635; G06F 3/0484; H04W 4/021
USPC .... 705/32, 7.42, 35, 3, 321, 320; 340/573.1, 340/8.1, 10.4
See application file for complete search history.

(56) References Cited

U.S. PATENT DOCUMENTS

| | | | |
|---|---|---|---|
| 8,018,912 B2 | 9/2011 | Habetha | |
| 8,489,476 B1* | 7/2013 | Lester | G06Q 40/02 705/35 |
| 8,576,759 B2 | 11/2013 | Kopikare et al. | |
| 8,694,782 B2 | 4/2014 | Lambert et al. | |
| 9,111,402 B1* | 8/2015 | Krishnan | G07C 9/00158 |
| 9,549,325 B2 | 1/2017 | Huh et al. | |
| 2001/0056367 A1* | 12/2001 | Herbert | G06Q 10/10 705/7.42 |
| 2006/0025900 A1* | 2/2006 | Arnouse | B64D 45/0015 701/10 |
| 2006/0203991 A1* | 9/2006 | Kramer | H04M 3/5175 379/265.06 |
| 2009/0310573 A1 | 12/2009 | Sim et al. | |
| 2010/0008277 A1 | 1/2010 | Kopikare et al. | |
| 2011/0082777 A1* | 4/2011 | Chess | G06Q 10/1091 705/32 |

(Continued)

*Primary Examiner* — Olusegun Goyea
(74) *Attorney, Agent, or Firm* — Fish & Richardson P.C.

(57) ABSTRACT

Methods, systems, and apparatus for generating workplace movement visualizations. A method includes receiving a request for a user interface presentation that presents time spent by individuals in productive areas of a work site; receiving data specifying the presence of a plurality of personal wireless beacons within each of a plurality of areas of the worksite, wherein a first area of the plurality of areas is designated a productive area and wherein a second area of the plurality of areas is designated a nonproductive area; computing, for each of a plurality of time periods, a respective count of individuals within the first area designated as a productive area; generating a user interface presentation that presents the respective counts of individuals within the productive area; and providing the generated user interface presentation in response to the request.

17 Claims, 13 Drawing Sheets

(56) References Cited

U.S. PATENT DOCUMENTS

| | | | |
|---|---|---|---|
| 2011/0117923 A1* | 5/2011 | Yonezawa | G08B 13/196 |
| | | | 455/456.1 |
| 2011/0215911 A1* | 9/2011 | Cassels | G01K 7/01 |
| | | | 340/10.4 |
| 2012/0304207 A1* | 11/2012 | Hughes | H04H 60/31 |
| | | | 725/14 |
| 2013/0159203 A1* | 6/2013 | Munzer | G06Q 10/105 |
| | | | 705/321 |
| 2014/0035726 A1* | 2/2014 | Schoner | G06K 7/10366 |
| | | | 340/8.1 |
| 2014/0080491 A1 | 3/2014 | Tinnakornsrisuphap et al. | |
| 2014/0115668 A1 | 4/2014 | Stuntebeck et al. | |
| 2015/0029945 A1 | 1/2015 | Do et al. | |
| 2015/0213213 A1* | 7/2015 | Havard | G06Q 10/10 |
| | | | 705/3 |
| 2015/0356160 A1* | 12/2015 | Berwick | G06F 3/04842 |
| | | | 715/781 |
| 2016/0005300 A1* | 1/2016 | Laufer | H04W 4/02 |
| | | | 340/573.1 |
| 2016/0275473 A1 | 9/2016 | Moon | |
| 2017/0019765 A1 | 1/2017 | Hoyer et al. | |

\* cited by examiner

Headcount and Compliance

| Metric | Value | Change | 2 Week Average | Last Updated | Metric Description |
|---|---|---|---|---|---|
| Headcount | 605 | 201↑ | 472 | 15 May 00:00 | Total number of distinct individuals detected on site either by tag or gate swipe |
| DFR Count | 616 | 194↑ | 489 | 15 May 00:00 | Total number of planned onsite individuals (according to the DFR) |
| Tag Count | 514 | 174↑ | 383 | 14 May 15:49 | Total number of distinct tags detected on site |
| Gate Count | 592 | 199↑ | 465 | 14 May 15:49 | Total number of distinct individuals detected on site by gate swipe |
| Tag Compliance | ≈ 88% | 2%↑ | 83% | 15 May 00:00 | Percentage of individuals detected on site who were wearing their tag, given that they have a tag assigned to them |

FIG. 3B

WORKPLACE MOVEMENT VISUALIZATIONS

BACKGROUND

This specification relates to location-enabled devices.

Location-enabled devices are computing devices whose location can be discerned by the device itself or by another system. For example, a smart phone can have an integrated global positioning system (GPS) receiver that allows the smart phone to determine its location. Some location-enabled devices can obtain their location from data transmitted by nearby wireless access points. The wireless access point devices can share their own location, which informs the location-enabled device about its own location. Conversely, a wireless access point can record the location of a particular device by virtue of establishing communication with the device.

SUMMARY

Innovative aspects of the subject matter described in this specification may be embodied in methods that include the actions of receiving a request for a user interface presentation that presents time spent by individuals in productive areas of a work site; receiving data specifying the presence of a plurality of personal wireless beacons within each of a plurality of areas of the worksite, wherein a first area of the plurality of areas is designated a productive area and wherein a second area of the plurality of areas is designated a nonproductive area; computing, for each of a plurality of time periods, a respective count of individuals within the first area designated as a productive area; generating a user interface presentation that presents the respective counts of individuals within the productive area; and providing the generated user interface presentation in response to the request.

Other versions include corresponding systems, apparatus and computer programs, configured to perform the actions of the methods, encoded on computer storage devices. These and other versions may each optionally include one or more of the following features.

In some implementations the request for the user interface presentation that presents time spent by individuals in productive areas of a work site further specifies that the user interface presentation presents a comparison between personal wireless beacon presence data and access control system data.

In other implementations the method further comprises receiving second data describing accesses granted by an access control system to individuals to each of the plurality of areas of the worksite; determining that the first data is inconsistent with the second data; in response, determining an aggregate measure of individuals granted access by the access control system without having personal wireless beacons present within the work site; and wherein the determined aggregate measure of individuals granted access by the access control system without having personal wireless beacons present within the work site is presented in the generated user interface presentation.

In some cases the second data describing accesses granted by an access control system to individuals to the particular area of the work site comprises gate swipe data describing a gate count of individuals that have been granted access to the particular area of the work site.

In other cases the second data describing accesses granted by an access control system to individuals to the particular area of the work site specifies a respective identity of each individual granted access by the access control system.

In some implementations the request for the user interface presentation that presents time spent by individuals in productive areas of a work site further specifies that the user interface presentation presents a comparison between individuals that are present in productive areas versus nonproductive areas of a work site.

In other implementations the method further comprises computing, for each of the plurality of time periods, a respective second count of individuals within the second area designated as a nonproductive area; and wherein the generated user interface presentation further presents the respective first counts of individuals within the productive area over time and the respective second counts of individuals within the nonproductive area over time.

In some cases the request for the user interface presentation that presents time spent by individuals in productive areas of a work site further specifies that the user interface presentation presents a comparison between time spent by individuals in productive areas versus nonproductive areas of a work site.

In other cases the method further comprises computing, for each of the plurality of time periods, a respective second count of individuals within the second area designated as a nonproductive area; and wherein the generated user interface presentation further presents the respective first counts of individuals within the productive area as a percentage of time and the respective second counts of individuals within the nonproductive area as a percentage of time.

In some implementations the method further comprises receiving second data specifying an assigned amount of time to be spent by individuals within each of the plurality of areas of the worksite; and wherein the generated user interface presentation further presents the second data.

In some cases the request for the user interface presentation that presents time spent by individuals in productive areas of a work site further specifies that the user interface presentation presents a comparison between data relating to hours earned and data relating to hours budgeted.

In some implementations the method further comprises receiving second data specifying a sum of budgeted hours per activity; computing, for each of a plurality of time periods, a count of hours earned per activity using the first data; and wherein the generated user interface presentation further presents a comparison between the budgeted hours and the hours earned per activity.

In some cases the generated user interface further presents one or more metrics including at least one of (i) a total headcount of individuals within the particular area of the work site, (ii) a daily force report from vendors count, (iii) a planned full time equivalent count, (iv) lost or abandoned personal wireless beacon count, (v) daily force report hours, (vi) timesheet hours, (vii) swipe hours, (viii) a percentage of total time covered by the presence of a plurality of personal wireless beacons, (ix) an average number of minutes from shift start to arriving at the one or more workface zones, (x) an average number of minutes from leaving a last workface zone and leaving the worksite, and (xi) average break length.

In some implementations the first data specifying the presence of a plurality of personal wireless beacons within each of the plurality of areas of the worksite further specifies a respective identity of an individual associated with each personal wireless beacon in the plurality of personal wireless beacons.

In other implementations the received request for a user interface presentation specifies a time period for the respective counts of individuals within the productive area.

In some cases the user interface presentation comprises one or more graphical representations based on at least one of (i) the count of individuals within the first area designated as a productive area, (ii) a total number of people at the worksite, (iii) a count of individuals within the second area designated as a non-productive area, (iv) data specifying an assigned amount of time to be spent by individuals within each of the plurality of areas of the worksite, (v) data specifying budgeted hours per activity, or (vi) data specifying earned hours per activity.

In further cases the generated user interface presentation comprises one or more user-selectable filters that respectively filter the presentation according to one or more of (i) date, (ii) class, (iii) shift type, (iv) vendor, (v) role, or (vi) zone type.

In some implementations the generated user interface presentation comprises two user-selectable filters that filter the presentation according to (i) individuals who were planned to be within the particular area of a work site based on a vendor report, and (ii) individuals who were not planned to be within the particular area of a work site based on a vendor report, respectively.

In further implementations the generated user interface presentation comprises two user selectable buttons that presents the respective counts of individuals within the productive area as (i) chart form or (ii) table form, respectively.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. A digital turnaround system may be used to perform real time analysis and create visualizations of data representing the location and movement of individuals at a worksite. The performed data analysis and created visualizations may be used to determine one or more process efficiency improvements associated with work processes performed at the worksite. In some cases a digital turnaround system may be used to determine an increase in worksite efficiency by comparing planned supply with actual supply using gate swipe data and location data. For example, based on determining a number or percentage of people on site that are in possession of personal wireless devices, such as RFID devices, herein referred to as "personal wireless beacons", procedures can be installed that ensure float management and scheduling is functioning optimally, resulting in increases in productivity.

In other cases a digital turnaround system may be used to understand how a workforce moves between contractor areas (non productive zones) and workface areas (productive zones) during time on site. Such an understanding can be used to identify issues and improve efficiency. For example, it may be noticed that a workforce requires a significant amount of time to ramp up or down for breaks, wasting productivity time. Management may use this information to alter logistics within the worksite, for example providing alternative safe passage more directly between the workface and rest areas or resurrecting closer facilities.

In some cases a digital turnaround system may be used to understand how much time is being spent at the workface across vendors and roles by day. Such an understanding may be used to maximize the productivity of the worksite.

In some cases a digital turnaround system may be used to identify problems at the worksite, which may be subsequently fixed. For example, personal wireless beacon data may be used to track down missing equipment, or to report issues or emergencies.

A digital turnaround system may use location data, e.g., data from personal wireless beacons, to perform root cause analysis regarding where people are when not at a workface and work with vendors to change processes to minimize this non value added time. Furthermore, location dwell data can be used to understand excessive time in different areas which can be a leading indicator, especially when correlated with other work time data, as a sign of fatigue and a precursor to an incident, for example when people do not taking enough brakes or take an excessive amount of break time. Generally, the digital turnaround system may capture and visualize fatigue related information of interest, such as excessive time on site or excessive consecutive days worked. In addition, a digital turnaround system may be used to investigate vendor accountability, driven for example through a daily review of project progress vs. effort (Earned vs. Burn) comparison.

A digital turnaround system may be used to generate a user interface presentation that provides for real-time updates of key headcount information based on the frequency of data loaded by metric of interest, such as headcount, gate swipe, badge, DFR, etc. The generated user interface presentation may enable a user to click on such metrics thereby showing trend information throughout a specified execution period. Such metric charts support and enable turnaround leadership to drive greater accuracy in the data being captured.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a digital turnaround system for tracking the location and movement of individuals at a worksite using, for example, personal wireless devices, herein referred to as "personal wireless beacons" and Wi-Fi access points distributed throughout the worksite. Data specifying the tracked location of the individuals at the worksite is provided to a digital turnaround system, where real time analysis of the data is performed and visualizations illustrating important properties of the data are created. A user may be able to apply filters to an interface containing the visualizations illustrating important properties of the data based on provided attributes to gain additional insights, such as through date, shift, location, project, vendor, or role filters. The data analysis and visualizations may be used to determine process efficiency improvements for the worksite and perform root cause analysis for any insight that is deemed pertinent.

Figure 1:
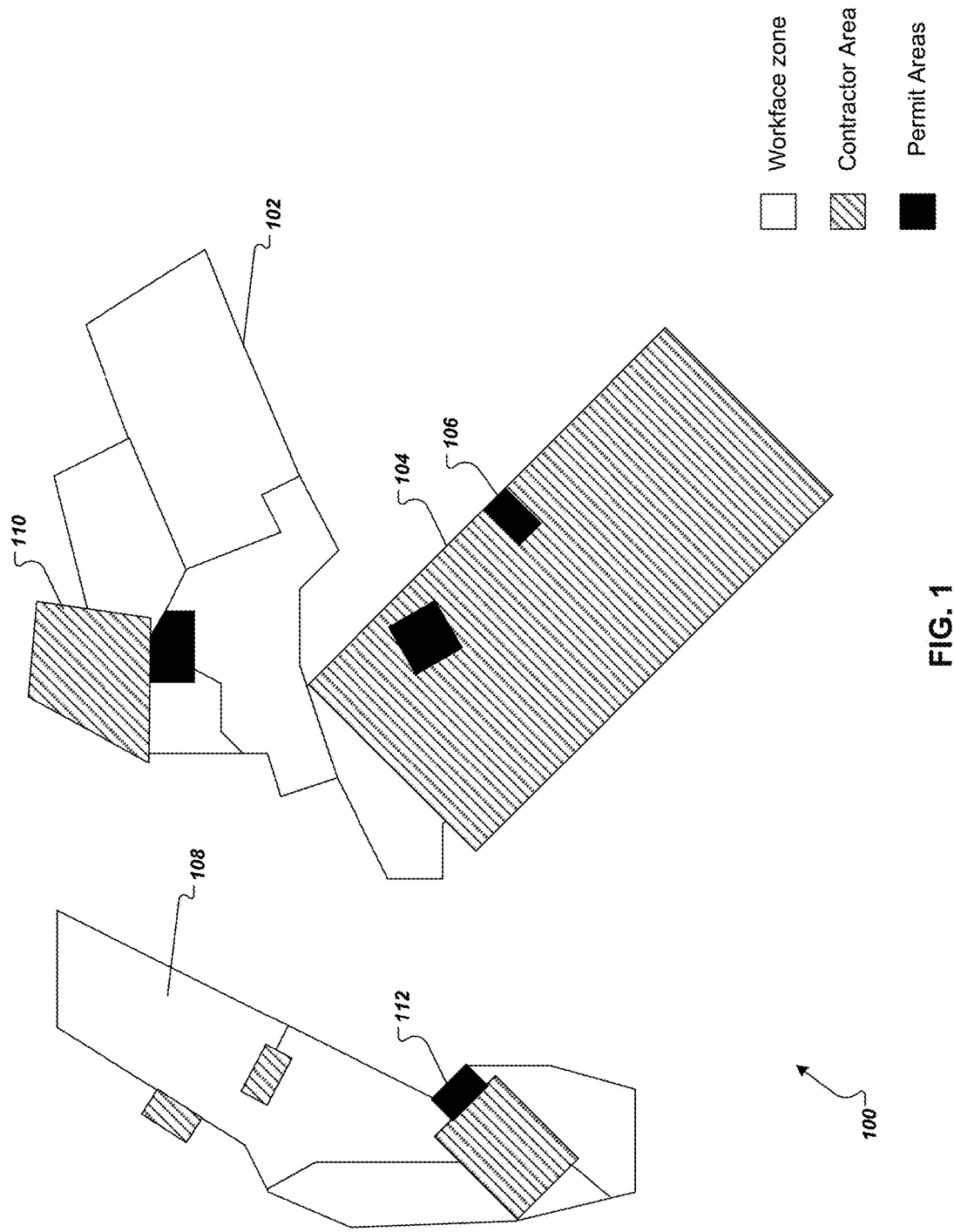
FIG. 1. depicts a map of an example worksite map with the different areas geo-fenced based on categorization of the zone.

FIG. 1 depicts a map of an example worksite 100. For example, the map of the example worksite could represent a mine, plant, factory or oil rig. The map of the example worksite 100 includes one or more areas, e.g., area 102, 104, and 106, that are geo-fenced and categorized based on workface zones, contractor areas and permit areas. The different geo-fenced areas, e.g., areas 102-112, may be used to judge productivity of the worksite, wherein productivity in a workface zone may be weighted heavier than the productivity in a contractor zone.

The workface areas, e.g., areas 102 and 108, are productive work areas in which standard work is performed. For example, as described above, the map of the example worksite could represent a mine, and the workface areas 102 and 108 could represent areas in which maintenance activities are required during the outage.

The contractor areas, e.g., areas 104 and 110, are non-productive work areas such as break rooms, designated smoking areas or trailers.

The permit areas, e.g., areas 108 and 112, are areas where contractors or vendor leadership get paperwork approval for the work that is going to be done on site and timing on having the people in the plant. This may often become an area of bottleneck during outages, therefore a separate zone of particular interest.

Figure 2:
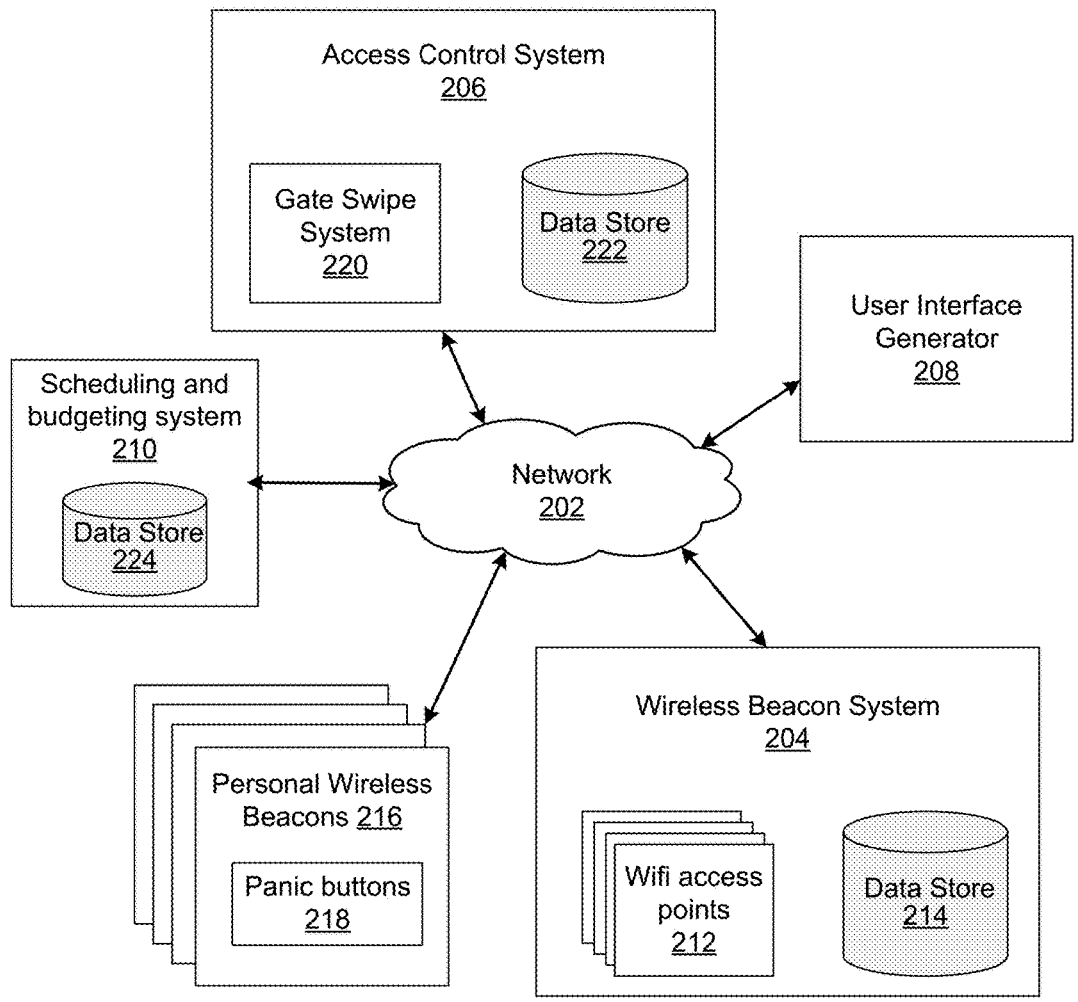
FIG. 2 depicts a block diagram of an example digital turnaround system.

FIG. 2 depicts a block diagram of an example digital turnaround system 200. The example digital turnaround system 200 may be used to perform real time analysis of data representing the location and movement of individuals at a worksite, e.g., the location and movement of individuals at worksite 100 of FIG. 1, using personal wireless beacons and Wi-Fi access points distributed throughout the worksite.

The example digital turnaround system 200 includes a network 202, e.g., a local area network (LAN), wide area network (WLAN), the Internet, or a combination thereof, wireless beacon system 204, access control system 206, user interface generator 208, and scheduling and budgeting system 210. The network 202 can be accessed over a wired and/or a wireless communications link. For example, mobile computing devices, such as smartphones can utilize a cellular network to access the network.

Wireless beacon system 204 includes one or more Wi-Fi access points 212 and data store 214, and is in communication with one or more personal wireless beacons 216. A personal wireless beacon 216 is an electronic device that may be worn or carried by an employee of the worksite, such as a radio frequency identification tag, and is capable of communicating with the wireless beacon system 204. In some implementations a personal wireless beacon may be placed on equipment or materials. In some examples a personal wireless beacon 216 may be installed on a device belonging to an employee of the worksite, such as an electronic device including personal computers, mobile communication devices, e.g., smartphones and/or tablet computing devices, or other devices that can communicate with the wireless beacon system 204 over the network 202. In other examples a personal wireless beacon 216 may be a wearable computing device that can communicate with the wireless beacon system 204 over the network 202. A smartwatch, (i.e., a watch that is enabled to communicate over the Internet) is an example of a wearable device. Other examples include mobile devices that are fitted with a clip mechanism and can be attached to items of clothing.

In some implementations, the personal wireless beacons 216 may be installed on an electronic device that is stored at a docking station and may be operable using employee accounts or other forms of identification. For example, an employee may be assigned an identity card, e.g., a near field communication (NFC) identity card, that can store information relating to the employee, such as a daily working schedule. The identity card may be used to activate and personalize an electronic device having a personal wireless beacon installed thereon, e.g., by touching the electronic device with the NFC identity card, enabling the electronic device to download the current working schedule of the employee.

The personal wireless beacons 216 may record respective locations and time tags using any type of location tracking infrastructure or technology that is capable of capturing location information, including but not limited to Bluetooth, WIFI, Cellular, GPS, or Microwave.

The one or more Wi-Fi access points 212 are devices that can detect the presence of a personal wireless beacon 216 within a given radius. The one or more Wi-Fi access points 212 may be located throughout the worksite, for example near entrances or exits to different work zones or areas, or entrances or exits to contractor zones such as break areas or smoking areas. Multiple Wi-Fi access points may be installed in a given work zone of the worksite, depending on the size, contents and expected amount of traffic in the work zone. The one or more Wi-Fi access points 212 are configured to detect the presence of a personal wireless beacon 216 and store data relating to the detected presence of the personal wireless beacon 216 in data store 214. Data relating to the detected presence of the personal wireless beacons 216 includes but is not limited to a time in which the beacon was detected, location at which the beacon was detected, an identity of the detected beacon and associated holder of the beacon. In some implementations the personal wireless beacons 216 may include a respective panic button that may be pushed by an employee in case of emergency situations, and data stored in data store 214 may include a time and location in which the panic button of a nearby personal wireless beacon was pressed.

Access control system 206 includes gate swipe system 220 and data store 222. The access control system 206 is a security measure installed at the worksite and provides limited access to different areas of the worksite. For example, gate swipe system 220 may include one or more gates, e.g., turnstile gates, at entrances and exits to different zones of the worksite. The gate swipe system may restrict the passage of individuals only to people who insert or swipe a valid pass, such as a near field communication identity card. Upon allowing or forbidding the passage of an individual with a corresponding swipe pass, gate swipe system 220 may store data relating to the swipe pass in data store 222. Data relating to the swipe pass includes but is not limited to a time in which the pass was swiped, location at which the pass was swiped, identity of the pass and associated holder of the pass, or whether the swiped pass or passage was successful or not.

Scheduling and budgeting system 210 includes information relating to scheduling and budgeting for the worksite. For example, scheduling and budgeting system 210 may be in communication with external vendors that are scheduled to work on site. The scheduling and budgeting system 210 may store data relating to worksite scheduling and budgeting in data store 224. For example, the worksite may prepare a monthly schedule of expected activities to take place at the worksite, and an expected number of employees of different skills and roles that are required. The monthly schedule may be stored in data store 224. Furthermore, at the end of a month, the scheduling and budgeting system 210 may receive a timesheet of recorded hours worked by employees of the worksite and store the timesheet in data store 224. Generally, data included in the data store 224 may include data relating to human resources, timesheets, safety and incident reports, work management, project planning, daily vendor reports, success criteria or other sources for improvement. The data may be sampled, for example by user interface generator 208 as described below, at varying intervals of time. For example, data relating to human resources may be sampled every 30 minutes, whereas data relating to safety and incidents may be sampled less often, such as twice a day. Other data, such as project planning or success criteria may be sampled once a day. For convenience scheduling and budgeting system 210 is depicted as a single system, however in some implementations the system 200 may include a separate scheduling system and separate budgeting system.

User interface generator 208 interprets location data on a frequent basis and presents it to the user. More specifically, user interface generator 208 is configured to receive requests for user interface presentations. User interface generator 208 is configured to communicate with wireless beacon system 204, access control system 206 and scheduling and budgeting system 210 to access data stored in data stores 214, 222 and 224 respectively. The user interface generator 208 uses the information stored in data stores 214, 222 and 224 to determine quantities of interest that are relevant to the request for a user interface presentation. Based on determined quantities of interest, user interface generator 208 generates an analytics dashboard for presentation that provides near real-time replication of the accessed data. In some implementations user interface generator 208 may include an extract-transform-load engine that is configured to run rules and generate data sets for visualization of metrics of interest.

For example, user interface generator 208 may receive a request for a user interface presentation that presents a comparison between personal wireless beacon presence data and access control system data. In response to the received request, the user interface generator 208 may extract first data specifying the presence of a plurality of personal wireless beacons within a particular area of a work site from data store 214 and second data describing accesses granted by an access control system to individuals to the particular area of the work site from data store 222. The user interface generator may be configured to compute an aggregate measure of individuals granted access by the access control system without having personal wireless beacons present within the work site and, based on the computed aggregate measure, generate a user interface presentation that presents the aggregate measure of individuals granted access by the access control system without having personal wireless beacons present within the work site. Generating user interface presentations based on data specifying the presence of a plurality of personal wireless beacons within a particular area of a work site is described in more detail below with reference to FIGS. 3A-7B.

Figure 3A:
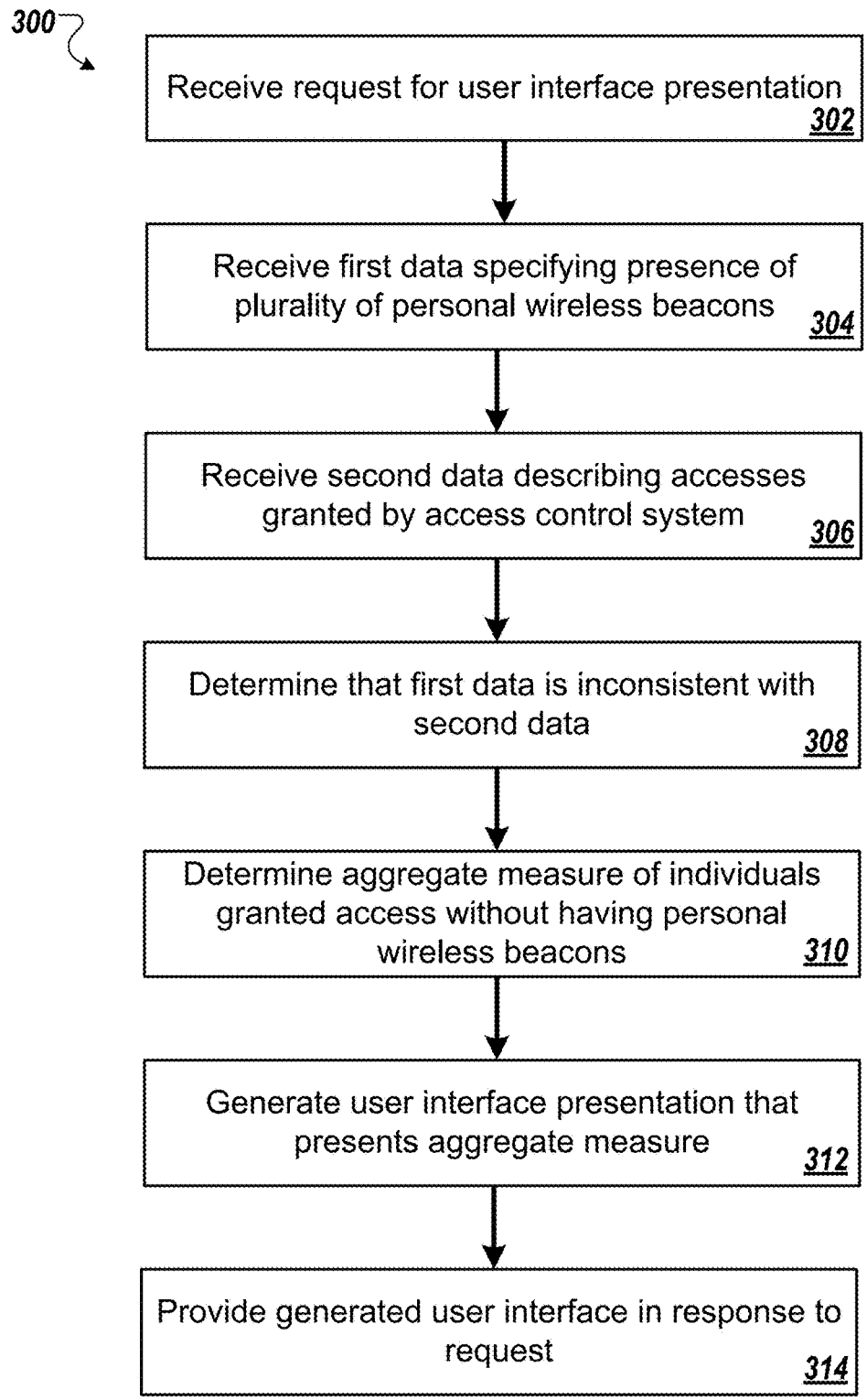
FIG. 3A depicts a flowchart of an example process for generating a user interface presentation that presents headcount and compliance data.

FIG. 3A depicts a flowchart of an example process 300 for generating a user interface presentation that presents headcount and compliance data. The process 300 can be implemented, for example, by the digital turnaround system 200 of FIG. 2 above.

The system receives a request for a user interface presentation that presents a comparison between personal wireless beacon presence data and access control system data (step 302). For example, a user requesting the user interface presentation that presents a comparison between personal wireless beacon presence data and access control system data may wish to validate that each individual located on site has correctly swiped into the access control system and is wearing a personal wireless beacon, in order for a reported headcount to reflect the number of individuals detected on site. The user may further wish to analyze which vendors or execution leads are adhering to target security measures, and whether vendors are ppe compliant.

In some implementations the received request for a user interface presentation that presents a comparison between personal wireless beacon presence data and access control system data specifies a time period for the personal wireless beacon presence data and access control system data. For example, the received request may specify a user interface presentation that presents a comparison between personal wireless beacon presence data and access control system data for a certain working day.

The system receives first data specifying the presence of a plurality of personal wireless beacons within a particular area of a work site (step 304). For example, the worksite may include multiple Wi-Fi access points in each area of the worksite that detect and log the presence of personal wireless beacons. In some implementations the first data specifying the presence of a plurality of personal wireless beacons within a particular area of a work site further specifies a respective identity of an individual associated with each personal wireless beacon in the plurality of personal wireless beacons.

The system receives second data describing accesses granted by an access control system to individuals to the particular area of the work site (step 306). For example, the worksite may include an access control system that monitors the entrance of permitted individuals to particular areas of the worksite. In some implementations the second data describing accesses granted by an access control system to individuals to the particular area of the work site includes gate swipe data describing a gate count of individuals that have been granted access to the particular area of the work site. For example, for security reasons, each area of the work swipe may be fitted with an entrance/exit gate that requires individuals to swipe a specifically assigned device in order to gain access to the respective area.

In other implementations the second data describing accesses granted by an access control system to individuals to the particular area of the work site specifies a respective identity of each individual granted access by the access control system. For example, as an individual swipes a gate using a personal wireless beacon or other device, e.g., a registered swipe card, in order to gain access to a particular area of the worksite, the gate or access control system may log a respective identity of the individual using the personal wireless beacon or other device. The identity of an individual may include an anonymous identification such as an identification number. In some implementations the gate or access control system may further log additional data, such as a time and date of the access request.

The system determines that the first data is inconsistent with the second data (step 308). For example, based on the received first data and second data, the system may determine that a gate swipe count does not match a personal wireless beacon ("tag") count, indicating that individuals are forgetting their personal wireless beacons or that new individuals are still waiting for personal wireless beacons to be assigned to them. The system may further determine that a daily force report count (DFR) is inconsistent with a gate count, indicating for example a manual entry problem with DFR and vendor reporting inaccuracy.

Figure 3B:
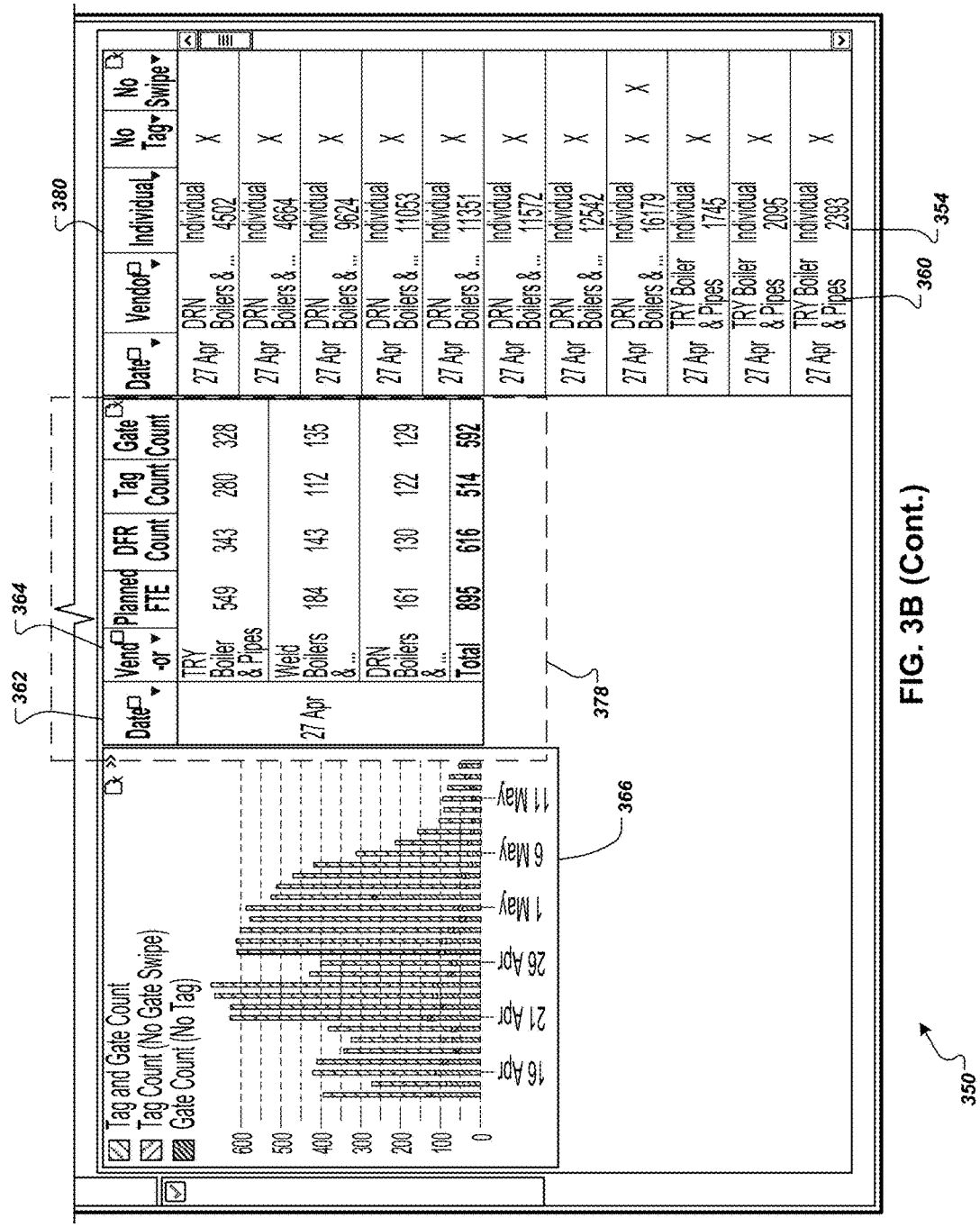
FIG. 3B depicts an example user interface presentation for presenting headcount and compliance data.

In response to determining that the first data is inconsistent with the second data, the system determines an aggregate measure of individuals granted access by the access control system without having personal wireless beacons present within the work site (step 310). FIG. 3B depicts an example user interface presentation 350 for presenting headcount and compliance data. For example, as presented in generated user interface presentation 350, the system may determine that 592 individuals were granted access by the access control system whereas 514 individuals were detected via personal wireless beacons, leaving an aggregate measure of 78. The system may determine other aggregate measures of interest relating to of individuals granted access by the access control system without having personal wireless beacons present within the work site.

The system generates a user interface presentation 350 that presents the aggregate measure of individuals granted access by the access control system without having personal wireless beacons present within the work site (step 312).

In some implementations the generated user interface presentation 350 further presents one or more metrics comprising (i) a total headcount of individuals within the particular area of the work site, (ii) a daily force report from vendors count, (iii) a planned full time equivalent count, (iv) lost or abandoned personal wireless beacon count. For example, the generated user interface 350 may include a column of metrics 358 that validate different types of headcount and compliance to wearing personal wireless beacons or swiping gate passes for security reasons. The metrics 358 presented in the generated user interface 350 include, but are not limited to, headcount, daily force report count, tag count, gate count, or tag compliance. The value column 372, change column 374 and 2 week average column 376 for the metrics may be determined based on the received first data specifying the presence of a plurality of personal wireless beacons within a particular area of a work site and the received second data describing accesses granted by an access control system to individuals to the particular area of the work site. In some implementations additional data may be received and used to determine values for the columns 372, 374 or 376, such as data specifying planned full time equivalents, or data received directly from vendors.

In some implementations the generated user interface presentation 350 includes one or more user-selectable filters that respectively filter the presentation according to one or more of (i) date, (ii) class, (iii) shift type, (iv) vendor, or (v) role. For example, the generated user interface presentation 350 may include a filter button 370 that, when selected, provides a user with a list of filters that can be applied to the presentation. The user may select a single filter or multiple filters of different types.

The list of filters may include a date filter that enables to user to specify a time period or date in which to filter the presentation. For example, in some implementations a user may wish to view an aggregated measure of individuals granted access by the access control system without having personal wireless beacons present within the work site during a single working day. In other implementations a user may wish to view the aggregated measure of individuals granted access by the access control system without having personal wireless beacons present within the work site on a more frequent basis, such as on an hourly basis, or every fifteen minutes. In the example generated user interface presentation 350, a user has filtered the results according to date, as shown by the presented date 362.

The list of filters may further include a shift type filter that enables users to specify a type of shift with which to filter the presentation. For example, in some implementations a user may wish to view an aggregated measure of individuals granted access by the access control system without having personal wireless beacons present within the work site during day shifts only. In other implementations a user may wish to view the aggregated measure of individuals granted access by the access control system without having personal wireless beacons present within the work site during night shifts only.

The list of filters may further include a vendor filter that enables users to specify a vendor with which to filter the presentation. For example, in some implementations a user may wish to view an aggregated measure of individuals from a particular vendor or group of vendors that were granted access by the access control system without having personal wireless beacons present within the work site. In the example generated user interface presentation 350, a user has filtered some results according to vendors relating to boiler makers, welders or pipe fitters, as shown by column 364. In particular, the user has filtered the results according to three specific vendors relating to "Boilers & Pipes", namely "DRN Boilers & Pipes" "TRY Boilers & Pipes" and "Weld Boilers & Pipes", as shown by columns 364 and 360.

The list of filters may further include a class type filter that enables users to specify a type of class of worker with which to filter the presentation. For example, in some implementations a user may wish to view an aggregated measure of craft personnel granted access by the access control system without having personal wireless beacons present within the work site. In other implementations a user may wish to view an aggregated measure of non-billable or indirect personnel granted access by the access control system without having personal wireless beacons present within the work site.

The list of filters may further include a role filter that enables users to specify a role with which to filter the presentation. For example, in some implementations a user may wish to view an aggregated measure of individuals with a particular role that were granted access by the access control system without having personal wireless beacons present within the work site. Particular roles can include boiler makers, pipe fitters or welders, as described above with reference to column 364, as well as engineers, laborers, operators, scaffolders, admin, electricians, inspectors, planners, etc.

The list of filters may further include other filters that are specific to the application of the generated user interface, such as project filters, plant or factory filters, zone filters, category filters or other relevant metrics. The list of filters can be used to refine the presented data in order to efficiently determine the sources of issues or inefficiencies, which may then be used to guide discussions with appropriate members of staff in order to determine process efficiency improvements, such as those relating to float management or rescheduling.

Once a user has selected one or more filters, the generated user interface presentation may present the relevant data or comparisons in the form of an additional table or list, such as table 378 or table 380. Table 378 presents filtered data that may be used to validate whether the presence of personal wireless beacons belonging to individuals from three particular vendors of a specific vendor type were detected, whether the personal wireless beacons were used alone or in conjunction with other devices to gain access to an area of the work site by an access control system, and whether the detected presence of beacons or granted accesses are in line with a daily attendance report received from the filtered vendors. For example, the table 378 shows that an original plan from the vendor "TRY Boiler&Pipes" required that 549 individuals be available for work on the 27 April, that the vendor claimed to have had 343 individuals signed in for the day, the presence of 280 of these individuals was detected via respective personal wireless beacons, and that 328 of these individuals were granted access to one or more work areas by the access control system. The differentials between these numbers may be easily noticed using table 378, and flagged as a topic for discussion, e.g., with vendor leadership. Table 380 presents filtered data that represents a running tally of individuals who did not have a personal wireless beacon onsite or that did not swipe in using an access control system. The data presented in the generated user interface presentation, e.g., the data presented in tables 378 and 380, may be used to generate an insight report for the specific time period and provided for analysis, e.g., to execution leadership.

In some implementations the generated user interface presentation includes one or more graphical representations based on at least one of (i) the first data, (ii) the second data, and (iii) the determined aggregate measure of individuals granted access by the access control system without having personal wireless beacons present within the work site. For example, the generated user interface presentation may include a bar graph or chart, such as graph 366, or other appropriate visual displays such as histograms, pie charts or line charts.

In some implementations the generated user interface presentation includes two user-selectable filters 368 and 356 that filter the presentation according to (i) individuals who were planned to be within the particular area of a work site based on a vendor report, i.e., in daily force report (DFR), and (ii) individuals who were not planned to be within the particular area of a work site based on a vendor report, i.e., not in DFR, respectively.

As described above with reference to step 308, in some implementations the system may determine that a DFR count is inconsistent with a gate count. In these cases, the system may flag or highlight this inconsistency separately on the generated user interface presentation.

The system provides the generated user interface presentation in response to the request (step 314). The generated user interface presentation that presents a comparison between personal wireless beacon presence data and access control system data may be used and analyzed to determine process efficiency improvements for the worksite, such as process improvements associated with resource reallocation.

Figure 4A:
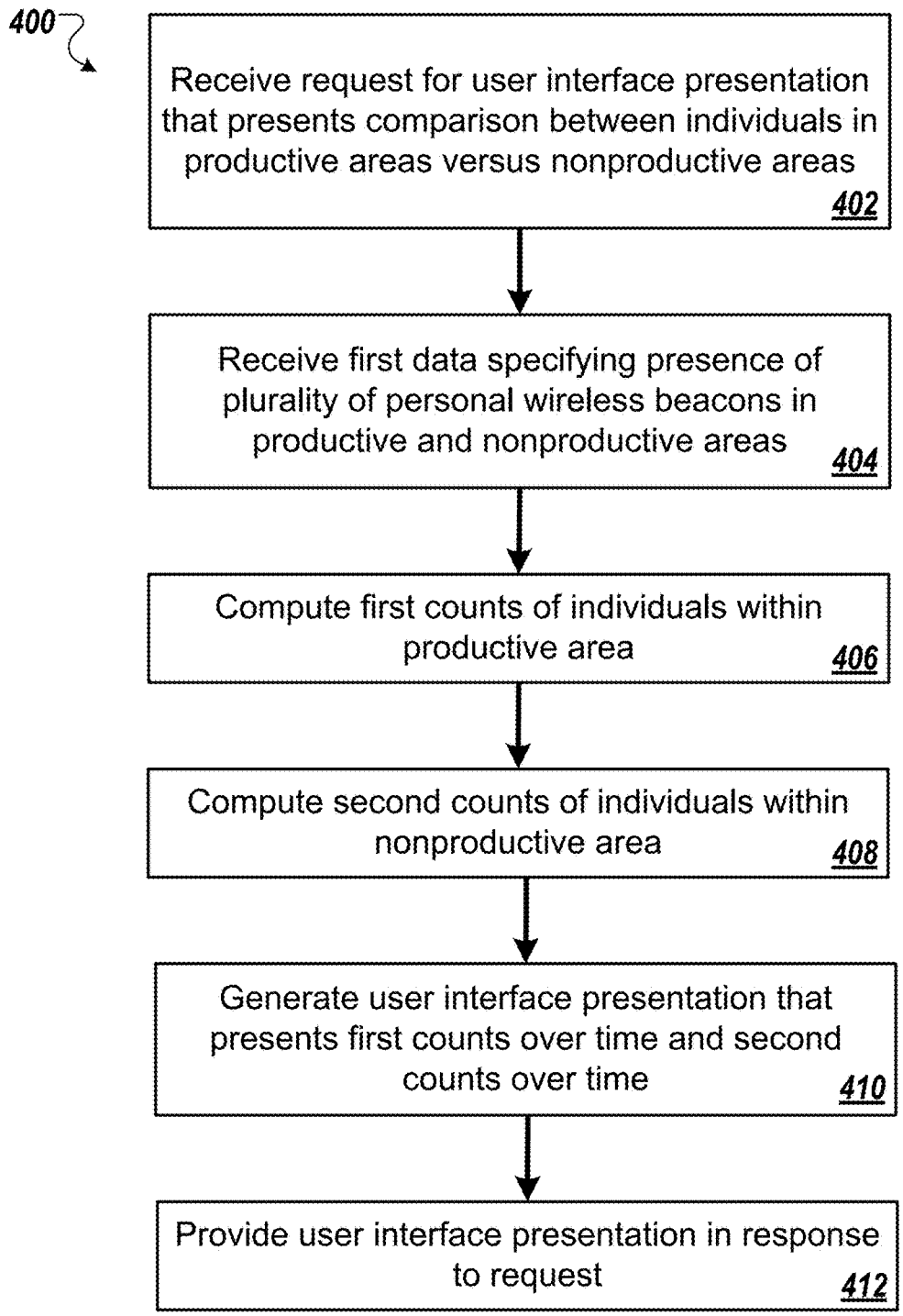
FIG. 4A depicts a flowchart of an example process for generating a user interface presentation that presents mass movement data.

FIG. 4A depicts a flowchart of an example process 400 for generating a user interface presentation that presents mass movement data. The process 400 can be implemented, for example, by the digital turnaround system 200 of FIG. 2 above.

The system receives a request for a user interface presentation that presents a comparison between individuals that are present in productive areas versus nonproductive areas of a work site (step 402). For example, a user requesting the user interface presentation that presents a comparison between individuals that are present in productive areas versus nonproductive areas of a work site may wish to understand how a workforce moves between productive areas, e.g., workface areas, and nonproductive areas, e.g., contractor areas, over a particular time period, e.g., a particular shift, to identify issues and improve efficiency. The user may wish to analyze whether workforce movement aligns with shift schedules, how quickly a workforce ramps up or down for breaks, or analyze anomalies to identify workforce movement issues.

In some implementations the received request for a user interface presentation that presents a comparison between individuals that are present in productive areas versus nonproductive areas of a work site specifies a time period for the comparison between individuals that are present in productive areas versus nonproductive areas of a work site. For example, the received request may specify a user interface presentation that presents a comparison between individuals that are present in productive areas versus nonproductive areas of a work site for one or more working days. In other examples the received request may specify a user interface presentation that presents a comparison between individuals that are present in productive areas versus nonproductive areas of a work site for one or more hours.

The system receives data specifying the presence of a plurality of personal wireless beacons within each of a plurality of areas of a work site, wherein a first area of the plurality of areas is designated a productive area, and wherein a second area of the plurality of areas is designated a nonproductive area (step 404). For example, the worksite may include multiple Wi-Fi access points in each area of the worksite that detect and log the presence of personal wireless beacons. In some implementations the data specifying the presence of a plurality of personal wireless beacons within each of the plurality of areas of the work site further, e.g., within the first, productive area and the second, nonproductive area, specifies a respective identity of an individual associated with each personal wireless beacon in the plurality of personal wireless beacons. The first area of the plurality of areas that is designated as a productive area may include workface zones, i.e., zones where standard work is planned to happen. The second area of the plurality of areas that is designated as a nonproductive area may include contractor zones, i.e., smoking areas, break areas, trailers.

The system computes, for each of a plurality of time periods, a respective first count of individuals within the first area designated as a productive area (step 406). For example, the system may use the data specifying the presence of a plurality of personal wireless beacons within each of a plurality of areas of the work site to determine the respective first count of individuals within the first area designated as a productive area. The length of each time period in the plurality of time periods for which the respective first counts are computed may vary. For example, in some implementations the time periods may be fixed to a predetermined length of the order of seconds or minutes.

The system computes, for each of the plurality of time periods, a respective second count of individuals within the second area designated as a nonproductive area (step 408). For example, the system may use the data specifying the presence of a plurality of personal wireless beacons within each of a plurality of areas of the work site to determine the respective second count of individuals within the second area designated as a nonproductive area. The length of each time period in the plurality of time periods for which the respective first counts are computed may vary. For example, in some implementations the time periods may be fixed to a predetermined length of the order of seconds or minutes.

Figure 4B:
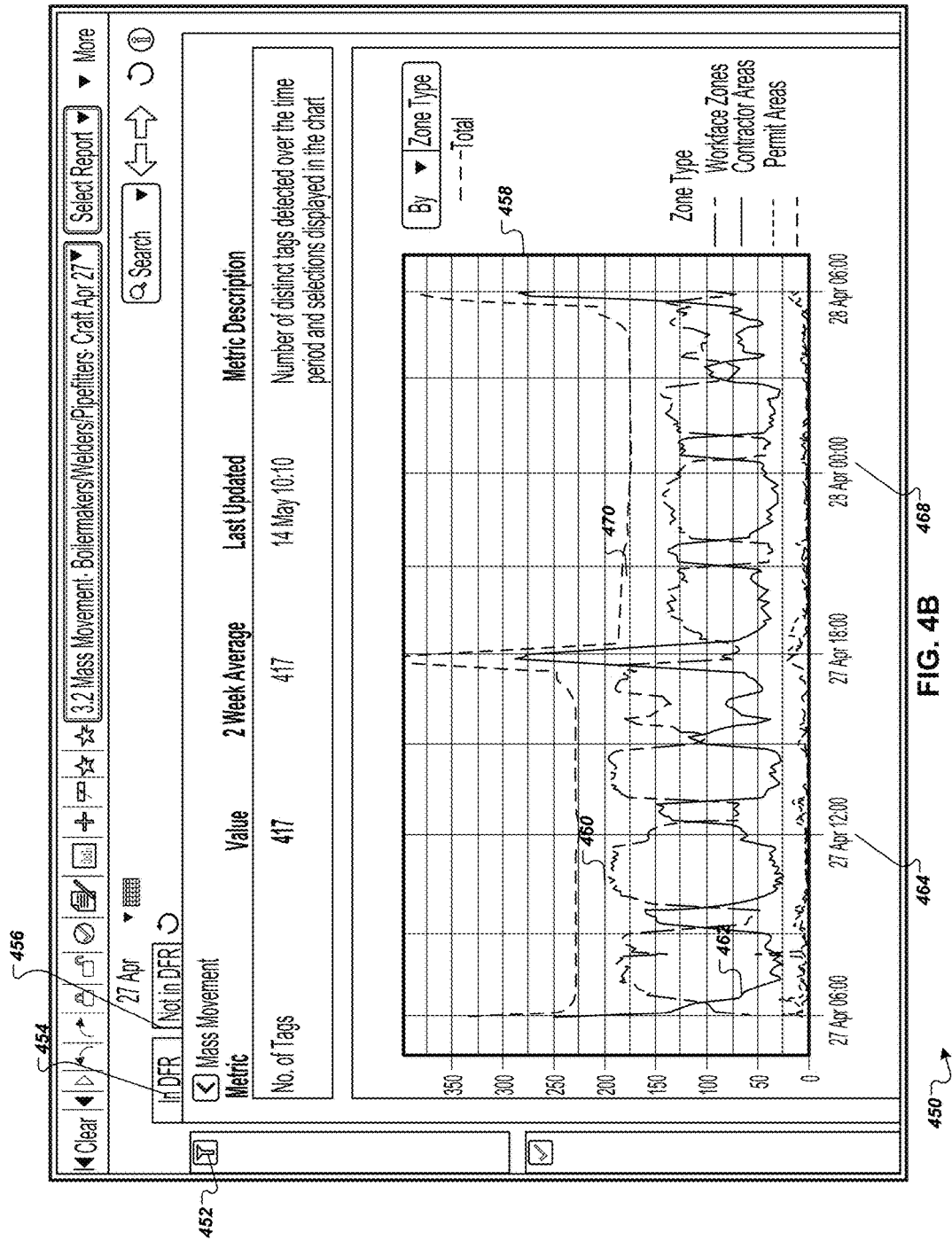
FIG. 4B depicts an example user interface presentation for presenting mass movement data.

The system generates a user interface presentation that presents the respective first counts of individuals within the productive area over time and the respective second counts of individuals within the nonproductive area over time (step 410). FIG. 4B depicts an example user interface presentation 450 that presents the respective first counts of individuals within the productive area over time and the respective second counts of individuals within the nonproductive area over time.

In some implementations the user interface presentation includes one or more graphical representations based on at least one of (i) first counts of individuals within the productive area over time, for example as indicated by personal wireless beacon data, (ii) the respective second counts of individuals within the nonproductive area over time, for example as indicated by personal wireless beacon data, or (iii) a total count of individuals within the productive area and nonproductive area over time, for example as indicated by personal wireless beacon data. For example, the generated user interface presentation 450 may include a line graph or time series, such as graph 458, or other appropriate visual displays.

The graphical representations included in the user interface presentation, e.g., graph 458, may be used to analyze the movement of individuals between the first area designated as a productive area and the second area designated as a nonproductive area. For example, as shown in graph 458, the presence of individuals in the first area designated as a productive area, e.g., workface area, may be plotted in the graph 458 as a line 460. The presence of individuals in the second area designated as a nonproductive area, e.g., contractor area, may be plotted in the graph 458 as a line 462. In some implementations the total count of personal wireless beacons present in the worksite may also plotted as a line 470 on the graph 458. The lines 462 and 460 may be used to analyze the movement of individuals between the first area designated as a productive area and the second area designated as a nonproductive area by time of day. For example, graph 458 clearly shows peaks in line 462 (and corresponding dips in line 460) at 06:00 and 18:00, indicating a larger number of individuals have been detected in nonproductive areas, due for example to a change in shift and a larger number of people leaving the productive areas or arriving onsite at a nonproductive area, such as a locker room or cafeteria. As another example, graph 458 clearly shows peaks and dips in lines 462 and 460 that indicate break times and lunchtime. As another example, graph 458 clearly shows a peak in line 470 at the end of a day shift and beginning of a night shift, and vice versa, when more individuals are detected via their personal wireless beacons.

In some implementations the generated user interface presentation includes one or more user-selectable filters that respectively filter the presentation according to one or more of (i) zone type, (ii) vendor, (iii) role, (iv) shift type, or (v) date. For example, the generated user interface presentation 450 may include a filter button 452 that, when selected, provides a user with a list of filters that can be applied to the presentation. The user may select a single filter or multiple filters of different types.

The list of filters may include a date filter that enables a user to specify a time period or date in which to filter the presentation. For example, in some implementations a user may wish to view a comparison between individuals that are present in productive areas versus nonproductive areas of a work site during one or more working days. In other implementations a user may wish to view a comparison between individuals that are present in productive areas versus nonproductive areas of a work site on a more frequent basis, such as on a minute by minute basis. In the example generated user interface presentation 450, a user has filtered the results according to date, as shown by the presented dates 464 and 468.

The list of filters may further include a shift type filter that enables users to specify a type of shift with which to filter the presentation. For example, in some implementations a user may wish to view a comparison between individuals that are present in productive areas versus nonproductive areas of a work site during day shifts only. In other implementations a user may wish to view a comparison between individuals that are present in productive areas versus nonproductive areas of a work site during night shifts only. By filtering based on day shifts or night shifts, certain types of noise may be removed from the generated user interface presentation, such as noise resulting from night shift workings arriving early on site whilst day shift workers are still working.

The list of filters may further include a vendor filter that enables users to specify a vendor with which to filter the presentation. For example, in some implementations a user may wish to view a comparison between individuals from a particular vendor or group of vendors that are present in productive areas versus nonproductive areas of a work site.

The list of filters may further include a role filter that enables users to specify a role with which to filter the presentation. For example, in some implementations a user may wish to view a comparison between individuals with a particular role that are present in productive areas versus nonproductive areas of a work site. Particular roles can include craft workers versus supervisors, or boiler makers, pipe fitters or welders, engineers, laborers, operators, scaffolders, admin, electricians, inspectors, planners, etc.

The list of filters may further include a zone type filter than enables users to specify a type of zone with which to filter the presentation. For example, in some implementations a user may wish to view a comparison between individuals that are present in productive areas zones versus nonproductive areas of particular zones of the worksite.

The list of filters may further include other filters that are specific to the application of the generated user interface, such as project filters, plant or factory filters, zone filters, category filters, class filters or other relevant metrics. The list of filters can be used to refine the presented data in order to efficiently determine the sources of issues or inefficiencies, which may then be used to guide discussions with appropriate members of staff in order to determine process efficiency improvements, such as those relating to float management or rescheduling.

In some implementations the generated user interface presentation includes two user-selectable filters 454 and 456 that filter the presentation according to (i) individuals who were planned to be within the particular area of a work site based on a vendor report, i.e., in daily force report (DFR), and (ii) individuals who were not planned to be within the particular area of a work site based on a vendor report, i.e., not in DFR, respectively.

The system provides the generated user interface presentation in response to the request (step 412). The generated user interface presentation that presents the respective first counts of individuals within the productive area over time and the respective second counts of individuals within the nonproductive area over time may be used and analyzed to determine process efficiency improvements for the worksite. For example, it may be noticed when individuals who for lunch early and/or return late, when equipment fails such as a lift breaks or individuals need to be evacuated out of a productive area, or when individuals require a longer time to move from a productive area to a nonproductive area (or vice versa) due to poor logistical planning.

Figure 5A:
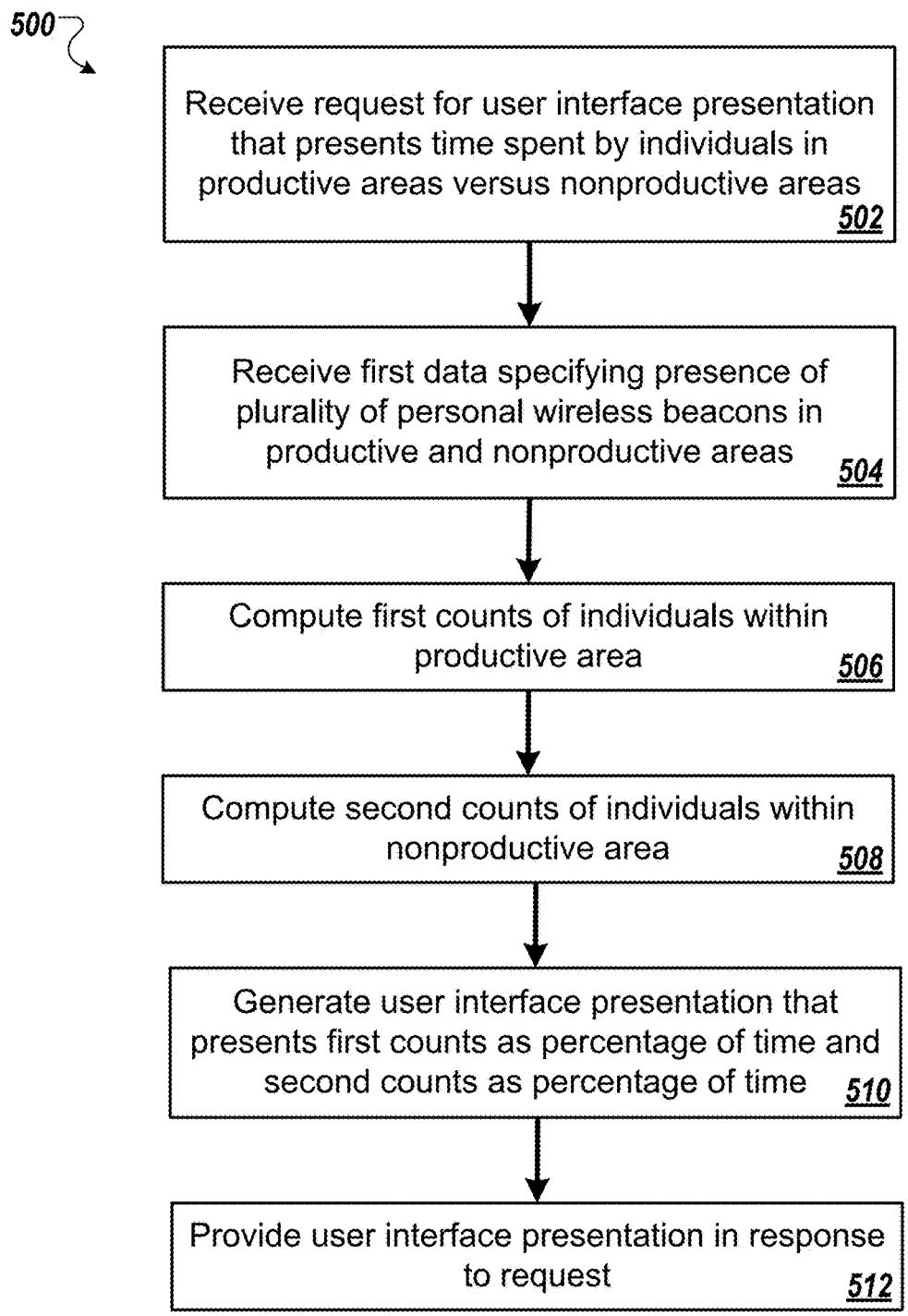
FIG. 5A depicts a flowchart of an example process for generating a user interface presentation that presents zone management data.

FIG. 5A depicts a flowchart of an example process 500 for generating a user interface presentation that presents zone management data. The process 500 can be implemented, for example, by the digital turnaround system 200 of FIG. 2 above.

The system receives a request for a user interface presentation that presents a comparison between time spent by individuals in productive areas versus nonproductive areas of a work site (step 502). For example, a user requesting the user interface presentation that presents a comparison between time spent by individuals in productive areas versus nonproductive areas of a work site may wish to understand how much time is being spent at the workface across vendors and roles by day, and use and analyze the user interface presentation in order to determine opportunities to maximize the amount of time being spent at the workface. Furthermore, a user requesting the user interface presentation that presents a comparison between time spent by individuals in productive areas versus nonproductive areas of a work site may wish to compare the amount of time spent at the workface against the amount of time assigned to the workface area.

In some implementations the received request for a user interface presentation that presents a comparison between time spent by individuals in productive areas versus nonproductive areas of a work site specifies a time period for the comparison between time spent by individuals in productive areas versus nonproductive areas of a work site. For example, the received request may specify a user interface presentation that presents a comparison between time spent by individuals in productive areas versus nonproductive areas of a work site for one working day. In other examples the received request may specify a user interface presentation that presents a comparison between individuals that are present in productive areas versus nonproductive areas of a work site for one or more hours.

The system receives data specifying the presence of a plurality of personal wireless beacons within each of a plurality of areas of a work site, wherein a first area of the plurality of areas is designated a productive area, and wherein a second area of the plurality of areas is designated a nonproductive area (step 504). For example, the worksite may include multiple Wi-Fi access points in each area of the worksite that detect and log the presence of personal wireless beacons. In some implementations the data specifying the presence of a plurality of personal wireless beacons within each of the plurality of areas of the work site further, e.g., within the first, productive area and the second, nonproductive area, specifies a respective identity of an individual associated with each personal wireless beacon in the plurality of personal wireless beacons. The first area of the plurality of areas that is designated as a productive area may include workface zones, i.e., zones where standard work is planned to happen. The second area of the plurality of areas that is designated as a nonproductive area may include contractor zones, i.e., smoking areas, break areas, trailers.

In some implementations the system receives second data specifying an assigned amount of time to be spent by individuals within each of the plurality of areas of the worksite. For example, the second data may include work schedules for individuals that specify a specific area in which they should work at given times.

The system computes, for each of a plurality of time periods, a respective first count of individuals within the first area designated as a productive area (step 506). For example, the system may use the data specifying the presence of a plurality of personal wireless beacons within each of a plurality of areas of a work site to determine the respective first count of individuals within the first area designated as a productive area. The length of each time period in the plurality of time periods for which the respective first counts are computed may vary. For example, in some implementations the time periods may be fixed to a predetermined length of the order of seconds or minutes.

The system computes, for each of the plurality of time periods, a respective second count of individuals within the second area designated as a nonproductive area (step 508). For example, the system may use the data specifying the presence of a plurality of personal wireless beacons within each of a plurality of areas of a work site to determine the respective second count of individuals within the second area designated as a nonproductive area. The length of each time period in the plurality of time periods for which the respective first counts are computed may vary. For example, in some implementations the time periods may be fixed to a predetermined length of the order of seconds or minutes.

Figure 5B:
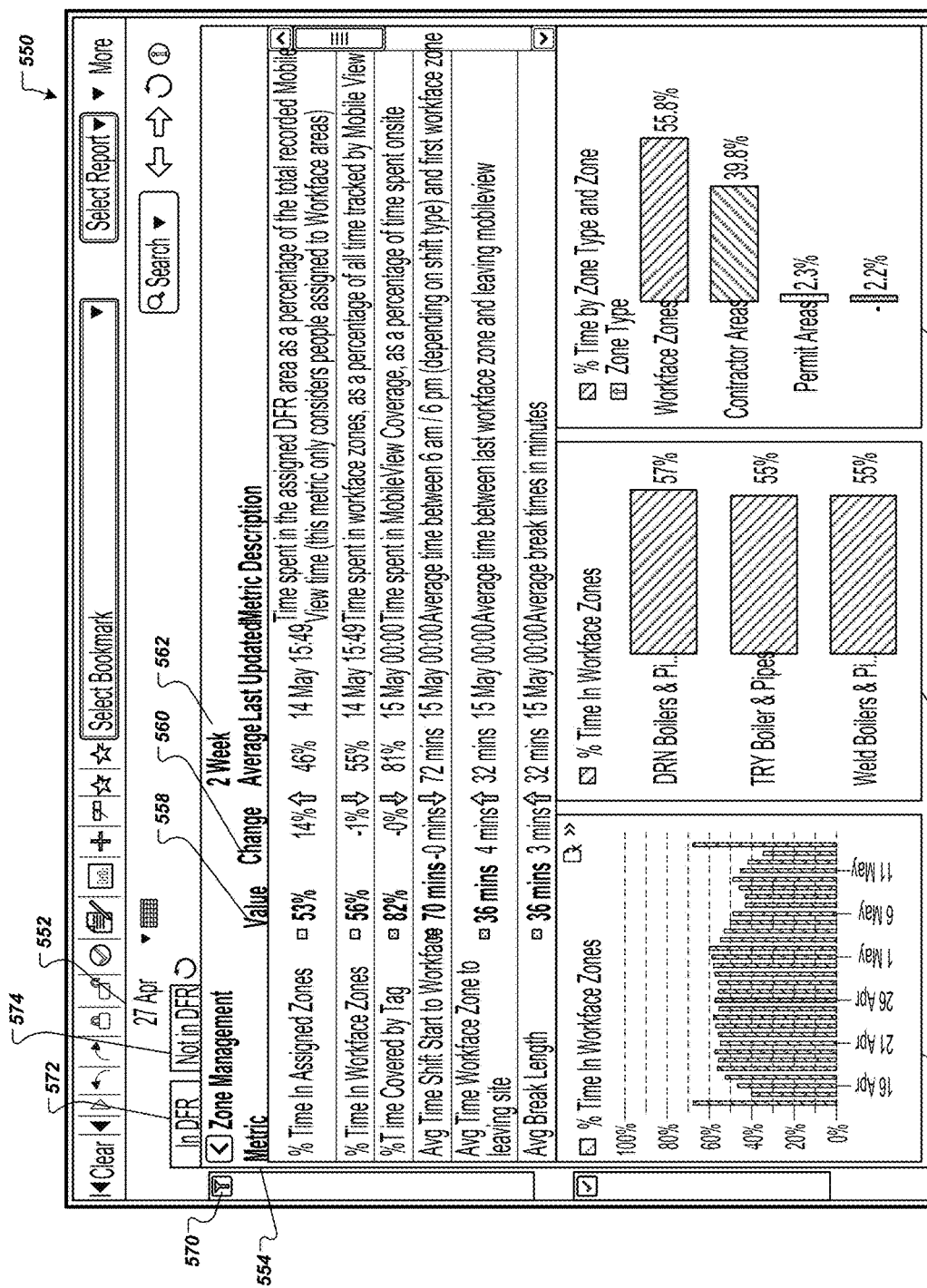
FIG. 5B depicts an example user interface presentation for presenting zone management data.

The system generates a user interface presentation that presents the respective first counts of individuals within the productive area as a percentage of time and the respective second counts of individuals within the nonproductive area as a percentage of time (step 510). In some implementations the system generates a user interface presentation that further presents the second data specifying an assigned amount of time to be spent by individuals within each of the plurality of areas of the worksite. FIG. 5B depicts an example user interface presentation 550 for presenting zone management data, i.e., respective first counts of individuals within the productive area as a percentage of time and the respective second counts of individuals within the nonproductive area as a percentage of time.

In some implementations the generated user interface presentation 550 further presents one or more metrics including (i) a percentage of total time covered by the presence of a plurality of personal wireless beacons (ii) an average number of minutes from shift start to arriving at the one or more workface zones as indicated by the personal wireless beacon data, (iii) an average number of minutes from leaving a last workface zone and leaving the worksite as indicated by the personal wireless beacon data, and (iv) average break length as indicated by the personal wireless beacon data. For example, the generated user interface 550 may include a column of metrics 554 that describe the amount of time individuals are spending in workface zones based on the personal wireless beacon data. The value column 558, change column 560 and 2 week average column 362 for the metrics may be determined based on the received first data specifying the presence of a plurality of personal wireless beacons within a particular area of a work site and, in some implementations, the received second data specifying an assigned amount of time to be spent by individuals within each of the plurality of areas of the worksite. In some implementations additional data may be received and used to determine values for the columns 558, 560 or 562, such as data specifying planned full time equivalents, or data received directly from vendors.

In some implementations the generated user interface presentation includes one or more user-selectable filters that respectively filter the presentation according to one or more of (i) date, (ii) class, (iii) shift type, (iv) vendor, (v) role, or (vi) zone type. For example, the generated user interface presentation 550 may include a filter button 570 that, when selected, provides a user with a list of filters that can be applied to the presentation. The user may select a single filter or multiple filters of different types.

The list of filters may include a date filter that enables a user to specify a time period or date in which to filter the presentation. For example, in some implementations a user may wish to view a comparison between time spent by individuals in productive areas versus nonproductive areas of a work site during one or more working days. In other implementations a user may wish to view a comparison between time spent by individuals in productive areas versus nonproductive areas of a work site on a more frequent basis, such as on a minute by minute basis. In the example generated user interface presentation 550, a user has filtered the results according to date, as shown by the x-axis of chart 564.

The list of filters may further include a shift type filter that enables users to specify a type of shift with which to filter the presentation. For example, in some implementations a user may wish to view a comparison between time spent by individuals in productive areas versus nonproductive areas of a work site during day shifts only. In other implementations a user may wish to view a comparison between time spent by individuals in productive areas versus nonproductive areas of a work site during night shifts only. By filtering based on day shifts or night shifts, certain types of noise may be removed from the generated user interface presentation, such as noise resulting from night shift workings arriving early on site whilst day shift workers are still working.

The list of filters may further include a vendor filter that enables users to specify a vendor with which to filter the presentation. For example, in some implementations a user may wish to view a comparison between time spent by individuals from a particular vendor or group of vendors in productive areas versus nonproductive areas of a work site.

The list of filters may further include a role filter that enables users to specify a role with which to filter the presentation. For example, in some implementations a user may wish to view a comparison between time spent by individuals with a particular role in productive areas versus nonproductive areas of a work site. Particular roles can include craft workers versus supervisors, or boiler makers, pipe fitters or welders, engineers, laborers, operators, scaffolders, admin, electricians, inspectors, planners, etc.

The list of filters may further include a zone type filter than enables users to specify a type of zone with which to filter the presentation. For example, in some implementations a user may wish to view a comparison between time spent by individuals that are present in productive areas zones versus nonproductive areas of particular zones of the worksite.

The list of filters may further include other filters that are specific to the application of the generated user interface, such as project filters, plant or factory filters, zone filters, category filters, class filters or other relevant metrics. The list of filters can be used to refine the presented data in order to efficiently determine the sources of issues or inefficiencies, which may then be used to guide discussions with appropriate members of staff in order to determine process efficiency improvements, such as those relating to float management or rescheduling.

The list of filters may further include a class type filter that enables users to specify a type of class of worker with which to filter the presentation. For example, in some implementations a user may wish to view a comparison of the time spent by individuals of different classes in productive areas versus nonproductive area.

In some implementations the generated user interface presentation includes two user-selectable filters 572 and 574 that filter the presentation according to (i) individuals who were planned to be within the particular area of a work site based on a vendor report, i.e., in daily force report (DFR), and (ii) individuals who were not planned to be within the particular area of a work site based on a vendor report, i.e., not in DFR, respectively.

In some implementations the generated user interface presentation includes one or more graphical representations based on at least one of (i) the first count of individuals within the first area designated as a productive area, (ii) the second count of individuals within the second area designated as a nonproductive area, or (iii) the second data. For example, the generated user interface presentation may include one or more bar charts, such as charts 564, 566 and 568, or other appropriate visual displays.

The graphical representations included in the user interface presentation 550 may be used to determine percentages of time in which certain vendors spend in a productive area. For example, as shown in user interface presentation 550, a user has filtered the presented data according to a single working day 552 and by the vendors "TRY Boilers & Pipes", "DRN Boilers & Pipes" and "Weld Boilers & Pipes". The percentages of time spent by these vendors in productive areas is displayed in chart 566. In some implementations a user may gain further insight by filtering the results further to show only craft, reducing the effects of overhead individuals on the presented data.

The system provides the generated user interface presentation in response to the request (step 512). The generated user interface presentation that presents a comparison between time spent by individuals in productive areas versus nonproductive areas of a work site may be used and analyzed to determine process efficiency improvements for the worksite. For example, it may be easily noticed if a percentage of time spent by individuals in assigned areas is lower than intended, indicating that a workforce is not working in their assigned areas. In other examples, the time required by a workforce to ramp up and down each shift may be monitored, as well as whether vendors are adhering to recommended break times. For example, the generated user interface 550 shows that the ramp up time for the filtered vendors is more than twice of the ramp down time. Similarly, generated user interface 550 shows that each vendor is taking, on average, breaks that are 6 minutes longer than allocated.

Figure 6A:
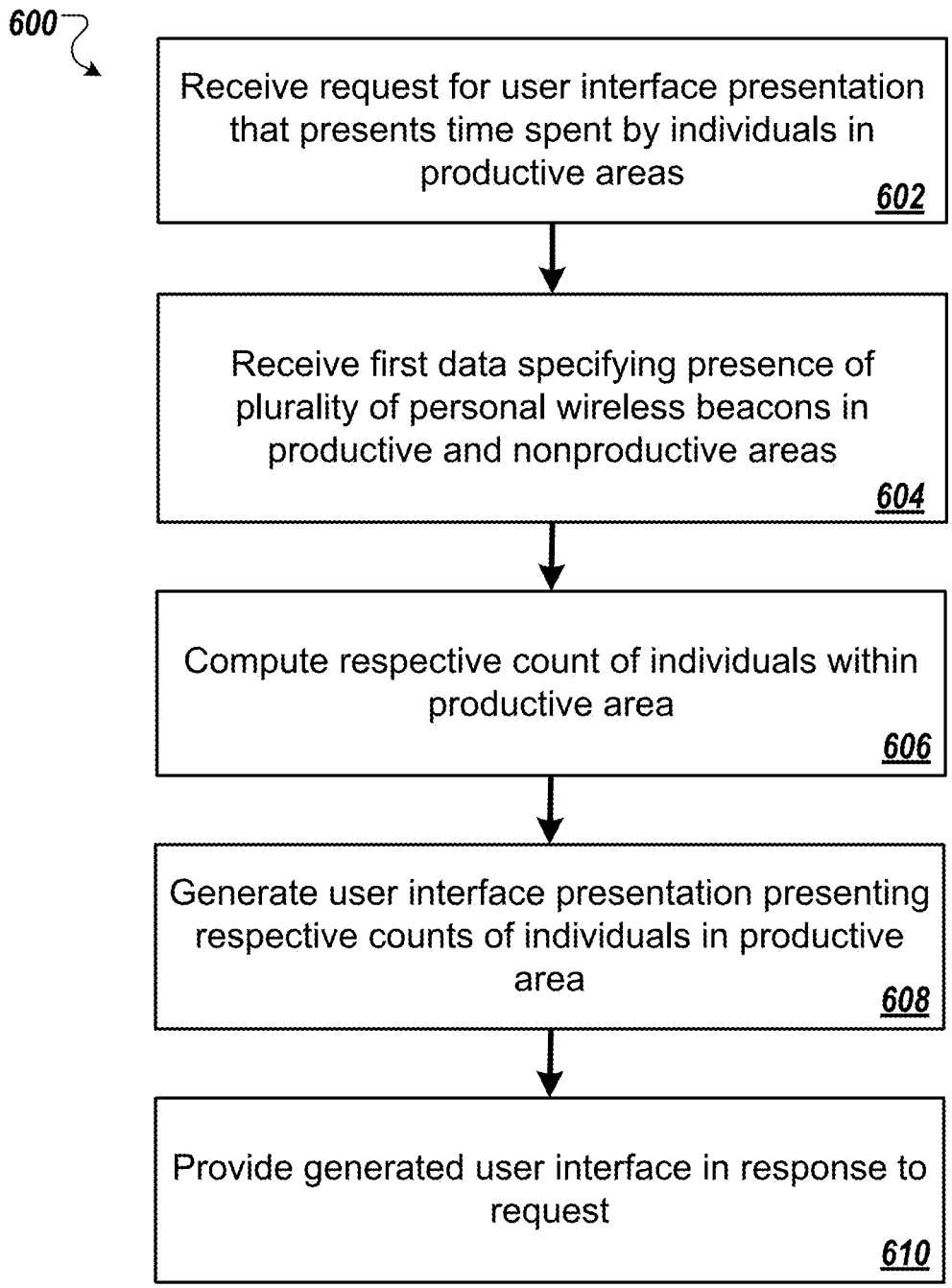
FIG. 6A depicts a flowchart of an example process for generating a user interface presentation that presents detailed zone management data

FIG. 6A depicts a flowchart of an example process 600 for generating a user interface presentation that presents zone management data. The process 600 can be implemented, for example, by the digital turnaround system 200 of FIG. 2 above.

The system receives a request for a user interface presentation that presents a time spent by individuals in productive areas of a work site (step 602). For example, a user requesting the user interface presentation that presents a time spent by individuals in productive areas of a work site may wish to understand how much time is being spent at the productive workforce across vendors and roles by day, and use and analyze the user interface presentation in order to determine opportunities to maximize the amount of time being spent at the workface. In some implementations the received request for a user interface presentation that presents a time spent by individuals in productive areas of a work site specifies a time period for the time spent by individuals in productive areas of a work site.

The system receives data specifying the presence of a plurality of personal wireless beacons within each of a plurality of areas of the worksite, wherein a first area of the plurality of areas is designated a productive area (step 604). For example, the worksite may include multiple Wi-Fi access points in each area of the worksite that detect and log the presence of personal wireless beacons. In some implementations the data specifying the presence of a plurality of personal wireless beacons within each of the plurality of areas of the work site further, e.g., within the first, productive area and the second, nonproductive area, specifies a respective identity of an individual associated with each personal wireless beacon in the plurality of personal wireless beacons. The first area of the plurality of areas that is designated as a productive area may include workface zones, i.e., zones where standard work is planned to happen.

The system computes, for each of a plurality of time periods, a respective count of individuals within the first area designated as a productive area (step 606). For example, the system may use the data specifying the presence of a plurality of personal wireless beacons within each of a plurality of areas of a work site to determine the respective count of individuals within the first area designated as a productive area. The length of each time period in the plurality of time periods for which the respective counts are computed may vary. For example, in some implementations the time periods may be fixed to a predetermined length of the order of seconds or minutes.

Figure 6B:
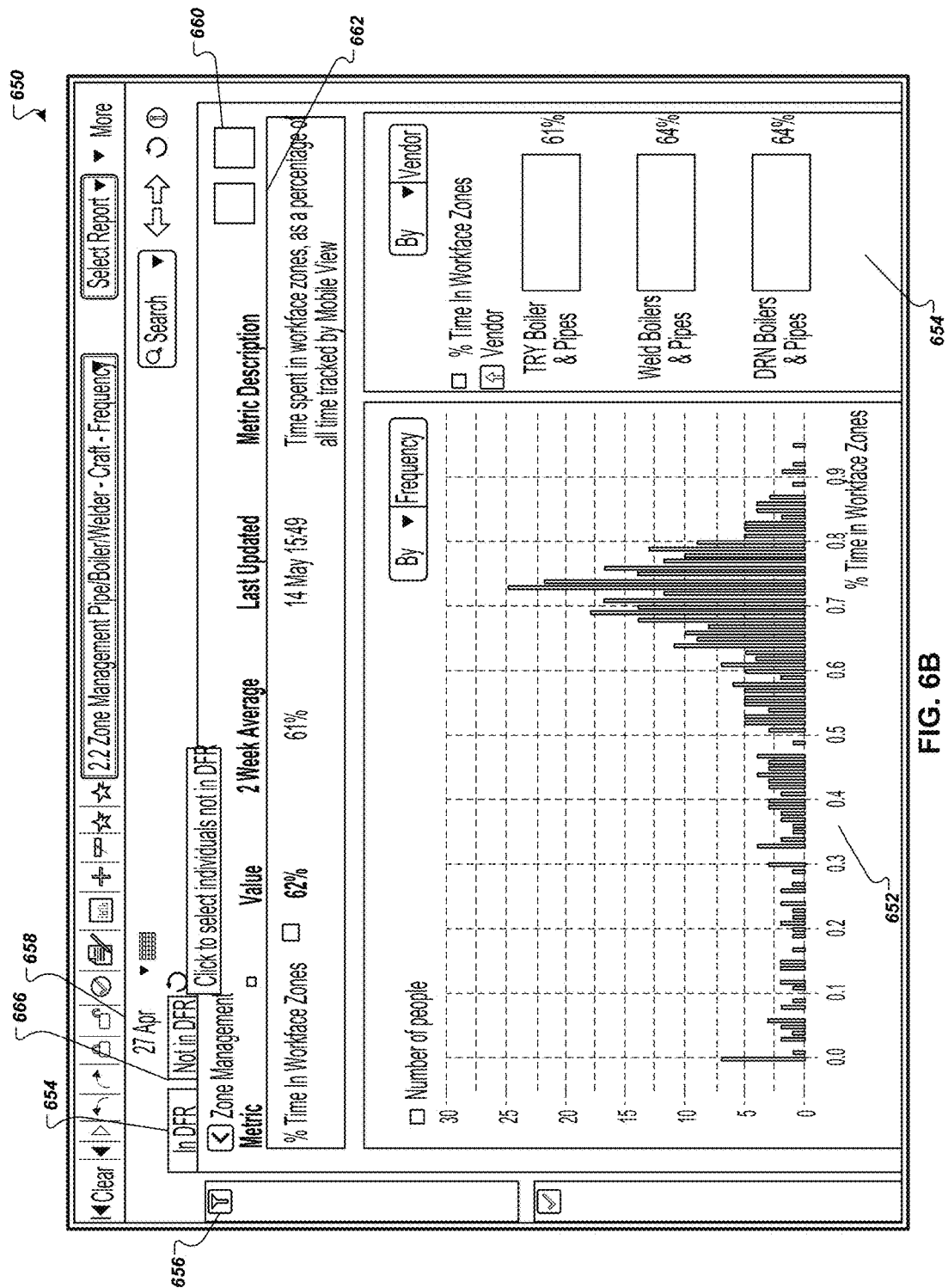
FIG. 6B depicts an example user interface presentation for presenting detailed zone management data.

The system generates a user interface presentation that presents the respective counts of individuals within the productive area (step 608). FIG. 6B depicts an example user interface presentation 650 for presenting zone management data.

In some implementations the user interface presentation includes one or more graphical representations based on at least one of (i) the count of individuals within the first area designated as a productive area, as indicated by the presence of personal wireless beacons, and (ii) total number of people at the worksite, as indicated by the presence of personal wireless beacons. For example, the generated user interface may include a one or more bar charts, such as bar charts 652 and 654 in user interface presentation 650, or other appropriate visual displays.

In some implementations the generated user interface presentation includes one or more user-selectable filters that respectively filter the presentation according to one or more of (i) date, (ii) class, (iii) shift type, (iv) vendor, or (v) role. For example, the generated user interface presentation 450 may include a filter button 656 that, when selected, provides a user with a list of filters that can be applied to the presentation. The user may select a single filter or multiple filters of different types.

The list of filters may include a date filter that enables a user to specify a time period or date in which to filter the presentation. For example, in some implementations a user may wish to view a time spent by individuals in productive areas of a work site during one or more working days. In other implementations a user may wish to view a time spent by individuals in productive areas of a work site on a more frequent basis, such as on a minute by minute basis. In the example generated user interface presentation 450, a user has filtered the results according to date, as shown by the presented date 658.

The list of filters may further include a shift type filter that enables users to specify a type of shift with which to filter the presentation. For example, in some implementations a user may wish to view a time spent by individuals in productive areas of a work site during day shifts only. In other implementations a user may wish to view a time spent by individuals in productive areas of a work site during night shifts only.

The list of filters may further include a vendor filter that enables users to specify a vendor with which to filter the presentation. For example, in some implementations a user may wish to view a time spent by individuals from a particular vendor or group of vendors in productive areas of a work site. For example, as shown in user interface presentation 650, a user has filtered the presented data according to vendors "TRY Boilers & Pipes", "DRN Boilers & Pipes" and "Weld Boilers & Pipes", as shown in bar chart 654.

The list of filters may further include a role filter that enables users to specify a role with which to filter the presentation. For example, in some implementations a user may wish to view a time spent by individuals with a particular role in productive areas of a work site. Particular roles can include craft workers versus supervisors, or boiler makers, pipe fitters or welders, engineers, laborers, operators, scaffolders, admin, electricians, inspectors, planners, etc.

The list of filters may further include a zone type filter than enables users to specify a type of zone with which to filter the presentation. For example, in some implementations a user may wish to view a time spent by individuals in certain productive areas zones of the worksite.

The list of filters may further include other filters that are specific to the application of the generated user interface, such as project filters, plant or factory filters, zone filters, category filters, class filters or other relevant metrics. The list of filters can be used to refine the presented data in order to efficiently determine the sources of issues or inefficiencies, which may then be used to guide discussions with appropriate members of staff in order to determine process efficiency improvements, such as those relating to float management or rescheduling.

In some implementations the generated user interface presentation includes two user selectable buttons 660 and 662 that presents the respective counts of individuals within the productive area as (i) chart form or (ii) table form, respectively. For example, in some implementations a user of the generated user interface presentation may wish to manipulate and analyze the data presented in the user interface presentation using spreadsheet software, and may therefore wish to view the presented data in table form.

In some implementations the generated user interface presentation includes two user-selectable filters 664 and 666 that filter the presentation according to (i) individuals who were planned to be within the particular area of a work site based on a vendor report, i.e., in daily force report (DFR), and (ii) individuals who were not planned to be within the particular area of a work site based on a vendor report, i.e., not in DFR, respectively.

Chart 652 in FIG. 6B has been filtered to present the percentage of time in one day a number of individuals from the vendors "TRY Boilers & Pipes", "DRN Boilers & Pipes" and "Weld Boilers & Pipes" has spent in a productive area of the worksite, as indicated by the personal wireless beacon data. The chart shows an approximate normal distribution with peak at 73% and a long tail to the left, enabling a user of the user interface presentation to determine that bringing the outliers into a normal distribution could increase overall value by more than 10%, for example.

The system provides the generated user interface presentation in response to the request (step 610). The generated user interface presentation that presents a time spent by individuals in productive areas of a work site may be used to determine process efficiency improvements for the worksite. For example, by filtering different classes, e.g., craft, or vendors, the graphical representation may vary and provide insight into how different roles or vendors behave.

Figure 7A:
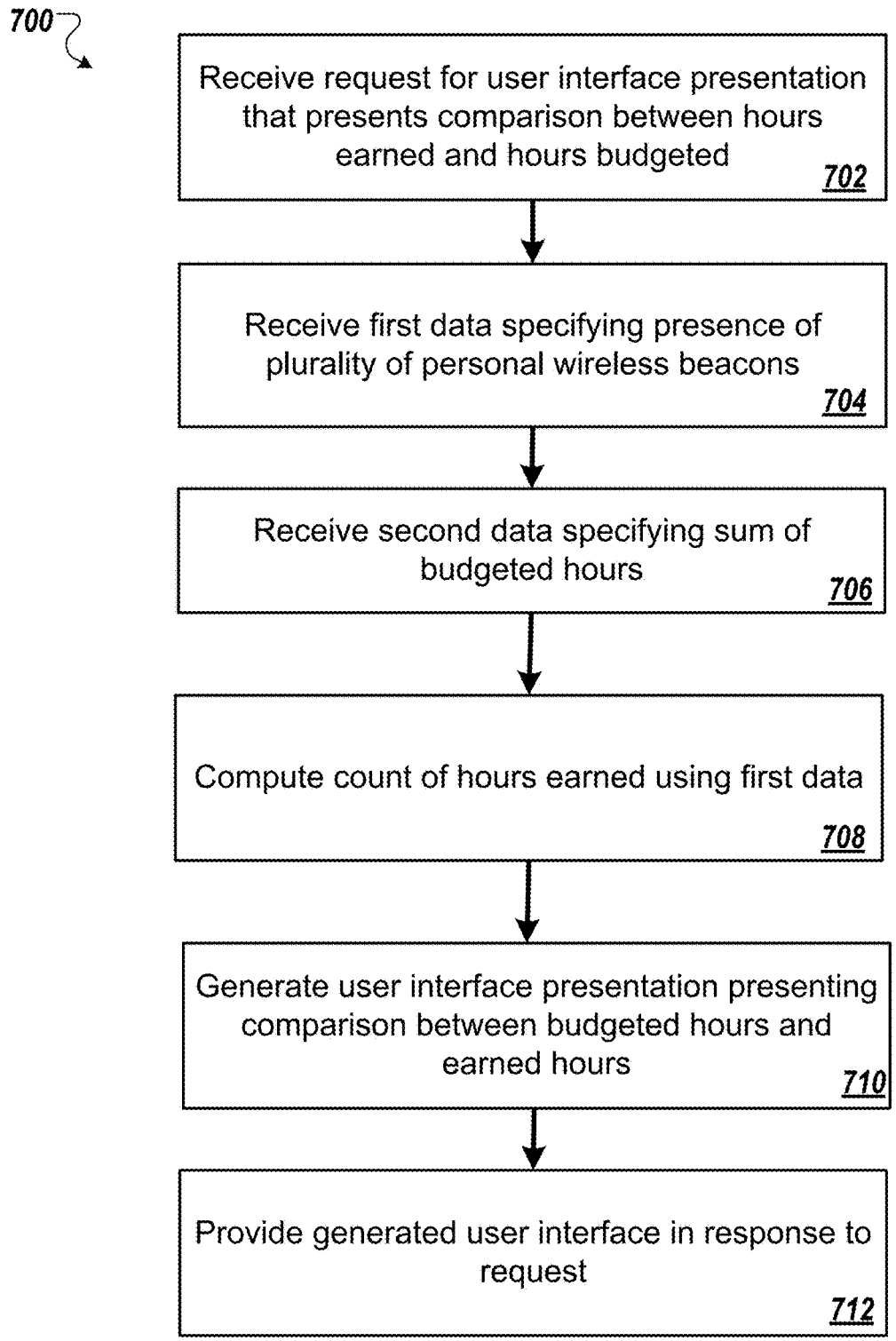
FIG. 7A depicts a flowchart of an example process for generating a user interface presentation that presents progress management data.

FIG. 7A depicts a flowchart of an example process 700 for generating a user interface presentation that presents progress management data. The process 700 can be implemented, for example, by the digital turnaround system 200 of FIG. 2 above.

The system receives a request for a user interface presentation that presents a comparison between data relating to hours earned and data relating to hours budgeted (step 702). For example, a user requesting the user interface presentation that presents a comparison between data relating to hours earned and data relating to hours budgeted may wish to compare planned and earned hours to see a "earn versus burn" ratio across vendors, roles and work orders by day. In some implementations a percentage of time in the workface zone applied to earn-burn rows may also be added.

In some implementations the received request for a user interface presentation that presents a comparison between data relating to hours earned and data relating to hours budgeted specifies a time period for the comparison between data relating to hours earned and data relating to hours budgeted. For example, the received request may specify a user interface presentation that presents a comparison between data relating to hours earned and data relating to hours budgeted for a period of time, such as one month.

The system receives first data specifying the presence of a plurality of personal wireless beacons within each of a plurality of areas of the worksite (step 704). For example, the worksite may include multiple Wi-Fi access points in each area of the worksite that detect and log the presence of personal wireless beacons. In some implementations the data specifying the presence of a plurality of personal wireless beacons within each of the plurality of areas of the work site further specifies a respective identity of an individual associated with each personal wireless beacon in the plurality of personal wireless beacons.

The system receives second data specifying a sum of budgeted hours per activity (step 706). For example, the system may receive the second data specifying a sum of budgeted hours per activity from vendor reports or scheduling departments or timesheets.

The system computes, for each of a plurality of time periods, a count of hours earned per activity using the first data (step 708). For example, for each activity, the system may use the first data specifying the presence of a plurality of personal wireless beacons within each of a plurality of areas of the worksite to count a number of individuals working and a respective number of hours worked by each individual.

Figure 7B:
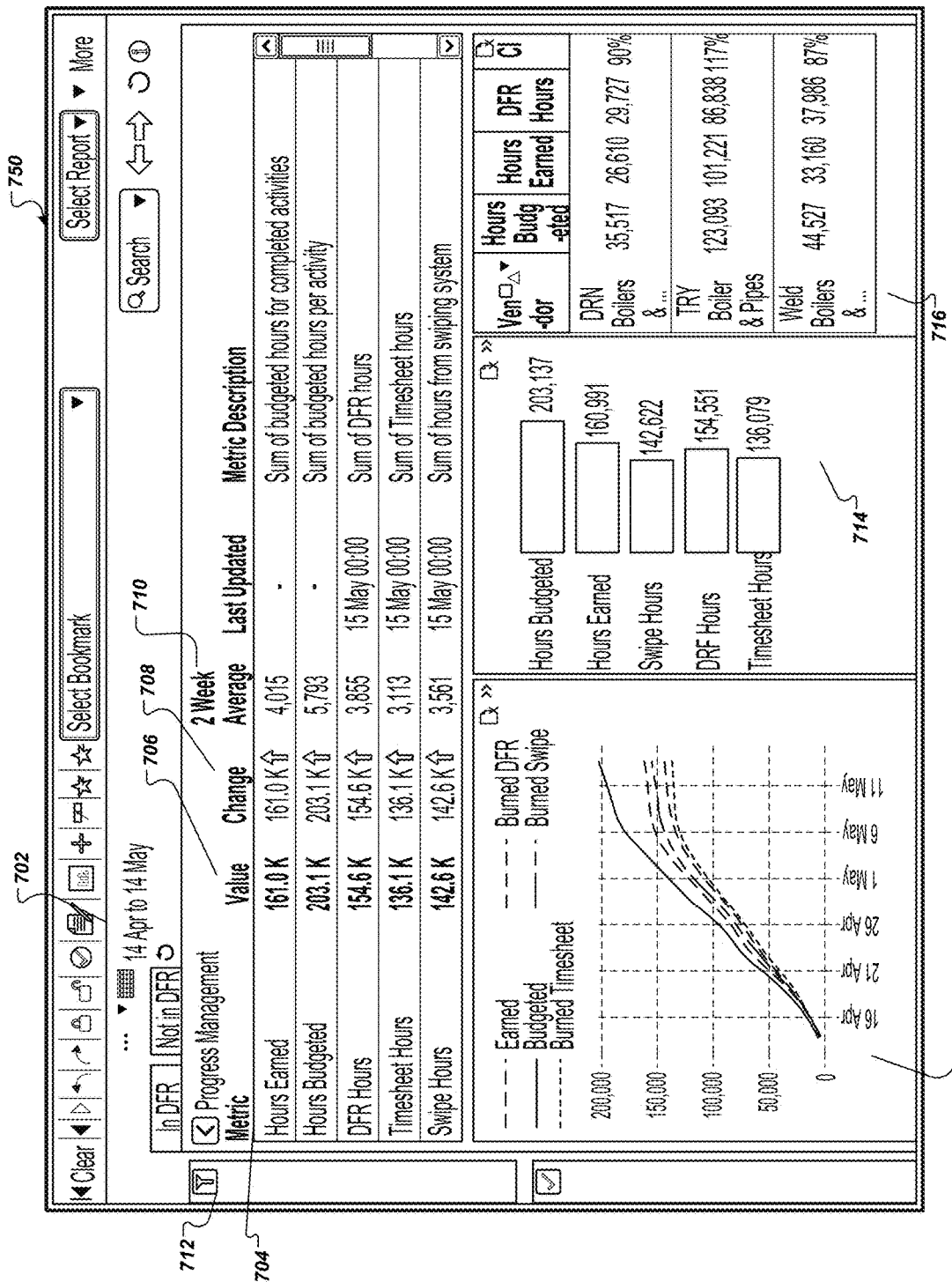
FIG. 7B depicts an example user interface presentation for presenting progress management data.

The system generates a user interface presentation that presents a comparison between the budgeted hours and the hours earned per activity (step 710). FIG. 7B depicts an example user interface presentation 750 for presenting progress management data. In some implementations the generated user interface further presents one or more metrics comprising (i) daily force report hours, (ii) timesheet hours, as indicated by personal wireless beacon data, or (iii) swipe hours. For example, the generated user interface 750 may include a column of metrics 706 that describe hours earned, for example as indicate by personal wireless beacon data, versus hours planned or budgeted. The value column 706, change column 708 and 2 week average column 710 for the metrics may be determined based on the received first data specifying the presence of a plurality of personal wireless beacons within a particular area of a work site and the received second data specifying a sum of budgeted hours per activity. In some implementations additional data may be received and used to determine values for the columns 706, 708 or 710, such as data specifying planned full time equivalents, or data received directly from vendors.

In some implementations the generated user interface presentation includes one or more user-selectable filters that respectively filter the presentation according to one or more of (i) date, (ii) class, (iii) shift type, (iv) vendor, (v) role, or (vi) zone type. For example, the generated user interface presentation 750 may include a filter button 712 that, when selected, provides a user with a list of filters that can be applied to the presentation. The user may select a single filter or multiple filters of different types.

The list of filters may include a date filter that enables a user to specify a time period or date in which to filter the presentation. For example, in some implementations a user may wish to view a comparison a comparison between the budgeted hours and the hours earned per activity during one or more working days. In other implementations a user may wish to view a comparison between the budgeted hours and the hours earned per activity on a more frequent basis, such as on a minute by minute basis. In the example generated user interface presentation 750, a user has filtered the results according to date 702.

The list of filters may further include a shift type filter that enables users to specify a type of shift with which to filter the presentation. For example, in some implementations a user may wish to view a comparison a comparison between the budgeted hours and the hours earned per activity during day shifts only. In other implementations a user may wish to view a comparison between the budgeted hours and the hours earned per activity during night shifts only.

The list of filters may further include a vendor filter that enables users to specify a vendor with which to filter the presentation. For example, in some implementations a user may wish to view a comparison between hours earned versus budgeted by individuals from a particular vendor or group of vendors.

The list of filters may further include a role filter that enables users to specify a role with which to filter the presentation. For example, in some implementations a user may wish to view a comparison between hours earned versus hours budgeted by individuals with a particular role. Particular roles can include craft workers versus supervisors, or boiler makers, pipe fitters or welders, engineers, laborers, operators, scaffolders, admin, electricians, inspectors, planners, etc.

The list of filters may further include a zone type filter than enables users to specify a type of zone with which to filter the presentation. For example, in some implementations a user may wish to view a comparison between hours earned versus hours budgeted by individuals that are present in particular zones of the worksite.

The list of filters may further include other filters that are specific to the application of the generated user interface, such as project filters, plant or factory filters, zone filters, category filters, class filters or other relevant metrics. The list of filters can be used to refine the presented data in order to efficiently determine the sources of issues or inefficiencies, which may then be used to guide discussions with appropriate members of staff in order to determine process efficiency improvements, such as those relating to float management or rescheduling.

The list of filters may further include a class type filter that enables users to specify a type of class of worker with which to filter the presentation. For example, in some implementations a user may wish to view a comparison of budgeted hours versus earned hours by individuals of different classes.

In some implementations the generated user interface presentation includes two user-selectable filters that filter the presentation according to (i) individuals who were planned to be within the particular area of a work site based on a vendor report, and (ii) individuals who were not planned to be within the particular area of a work site based on a vendor report, respectively.

In some implementations the generated user interface presentation includes one or more graphical representations based on at least one of (i) the budgeted hours per activity, or (ii) the computed earned hours per activity, based on the personal wireless beacon data. For example, the generated user interface presentation may include one or more bar charts or line charts, such as charts 712 or 714.

The graphical representations included in the user interface presentation 750 may be used to determine how budgeted hours compare to earned hours per vendor, of which vendors have the best earned versus burned ratios (CI). For example, as shown in user interface presentation 750, a user has filtered the presented data by the vendors 716 "TRY Boilers & Pipes", "DRN Boilers & Pipes" and "Weld Boilers & Pipes". The generated user interface presentation 750 may be used to determine whether work is taking more or less effort to complete than budgeted, and whether swipe hours are being inaccurately reported.

The system provides the generated user interface presentation in response to the request (712). The generated user interface presentation that presents a comparison between data relating to hours earned and data relating to hours budgeted may be used an analyzed to determine how budgeted hours compare to earned hours, which vendors have the best earned versus burned ratio, whether reported hours are being submitted in time sheets, or whether swipe hours or hours detected by personal wireless beacons align to reported hours. For example, by applying such high quality real-time data comparisons between data relating to hours earned and data relating to hours budgeted the vendor/owner leadership are able to more quickly evaluate CPI and fix and scheduling or staffing issues that may be present quicker.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
    detecting, by a plurality of wireless access points of a location tracking system that includes (i) the plurality of wireless access points, (ii) a plurality of access control devices, (iii) a user interface generator, and (iv) an extract-transform-load engine, personal wireless beacon data from a plurality of personal wireless beacons that are located within a worksite, the personal wireless beacon data including data identifying, for each personal wireless beacon, a time of detection, a location of a respective detecting wireless access point, a detected wireless beacon, and a daily working schedule of an individual, wherein the personal wireless beacon is configured to associate with the individual and load the daily working schedule of the individual in response to communicating with a near field communication card that stores data identifying the individual and the daily working schedule of the individual while the personal wireless beacon is stored on a docking station;

detecting, by the plurality of access control devices of the location tracking system, access control data describing accesses granted by an access control system to individuals to a first area of the worksite designated as a productive area of the worksite;

receiving, by the user interface generator of the location tracking system, a request for a user interface presentation that presents (i) time spent by individuals in the first area of the worksite, (ii) a comparison between the personal wireless beacon data and the access control data, (iii) the personal wireless beacon data and the access control data, and (iv) the daily working schedules for the individuals associated with the personal wireless beacon data that is collected from the personal wireless beacons that are associated with the individuals and that load the daily working schedules of the individuals in response to communicating with near field communication cards that store the data identifying the individuals and the daily working schedules of the individuals while the personal wireless beacons are stored on docking stations;

generating, by the user interface generator of the location tracking system, the user interface presentation that presents (i) the time spent by individuals in the first area of the worksite, (ii) the comparison between the personal wireless beacon data and the access control data, (iii) the personal wireless beacon data and the access control data, and (iv) the daily working schedules for the individuals associated with the personal wireless beacon data that is collected from the personal wireless beacons that are associated with the individuals and that load the daily working schedules of the individuals in response to communicating with near field communication cards that store the data identifying the individuals and the daily working schedules of the individuals while the personal wireless beacons are stored on the docking stations;

receiving, by the user interface generator of the location tracking system and within the user interface presentation, user input selecting a filter that specifies a plurality of time periods;

computing, by the extract-transform-load engine of the location tracking system and for each of the plurality of time periods, a respective first count of individuals within the first area of the worksite according to respective locations in the personal wireless beacon data;

computing, by the extract-transform-load engine of the location tracking system and for each of the plurality of time periods, a respective second count of individuals within the first area of the worksite according to the access control data;

comparing, by the extract-transform-load engine of the location tracking system, the first count of individuals according to the personal wireless beacon data to the second count of individuals according to the access control data;

based on comparing the first count of individuals according to the personal wireless beacon data to the second count of individuals according to the access control data, determining, by the extract-transform-load engine of the location tracking system, that the personal wireless beacon data is inconsistent with the access control data;

in response to determining that the personal wireless beacon data is inconsistent with the access control data, determining, by the extract-transform-load engine of the location tracking system, an aggregate measure of individuals granted access by the access control system without having personal wireless beacons present within the worksite;

updating, by the user interface generator of the location tracking system, the user interface presentation that presents (i) the time spent by individuals in the first area of the worksite, (ii) the comparison between the personal wireless beacon data and the access control data, (iii) the personal wireless beacon data and the access control data, and (iv) the daily working schedules for the individuals associated with the personal wireless beacon data that is collected from the personal wireless beacons that are associated with the individuals and that load the daily working schedules of the individuals in response to communicating with near field communication cards that store the data identifying the individuals and the daily working schedules of the individuals while the personal wireless beacons are stored on the docking stations, to present the respective counts of individuals within the first area, the aggregate measure of individuals granted access by the access control system without having personal wireless beacons present within the worksite, and the personal wireless beacon data and the access control data over each of the plurality of time periods; and providing, by the user interface generator of the location tracking system, the generated user interface presentation in response to the request.

2. The method of claim 1, wherein the access control data describing accesses granted by an access control system to individuals to the first area of the work site comprises gate swipe data describing a gate count of individuals that have been granted access to the first area of the work site.

3. The method of claim 1, wherein the access control data describing accesses granted by an access control system to individuals to the first area of the work site specifies a respective identity of each individual granted access by the access control system.

4. The method of claim 1, further comprising:
computing, for each of the plurality of time periods, a respective second count of individuals within a second area of the worksite designated as a nonproductive area,
wherein the generated user interface presentation further presents the respective first counts of individuals within the first area over time and the respective second counts of individuals within the second area over time.

5. The method of claim 1, wherein the request for the user interface presentation that presents time spent by individuals in the first area of the worksite further specifies that the user interface presentation presents a comparison between time spent by individuals in the first area versus a second area of the worksite designated as a nonproductive area.

6. The method of claim 5, further comprising:
computing, for each of the plurality of time periods, a respective second count of individuals within the second area,
wherein the generated user interface presentation further presents the respective first counts of individuals within the first area as a percentage of time and the respective second counts of individuals within the second area as a percentage of time.

7. The method of claim 6, further comprising:
receiving second data specifying an assigned amount of time to be spent by individuals within each of the first area and the second area,
wherein the generated user interface presentation further presents the second data.

8. The method of claim 1, wherein the request for the user interface presentation that presents time spent by individuals in the first area of the worksite further specifies that the user interface presentation presents a comparison between data relating to hours earned and data relating to hours budgeted.

9. The method of claim 8, further comprising:
receiving data specifying a sum of budgeted hours per activity;
computing, for each of the plurality of time periods, a count of hours earned per activity,
wherein the generated user interface presentation further presents a comparison between the budgeted hours and the hours earned per activity.

10. The method of claim 1, wherein the generated user interface further presents:
(i) a total headcount of individuals within the first area of the work site,
(ii) a daily force report from vendors count,
(iii) a planned full time equivalent count,
(iv) lost or abandoned personal wireless beacon count,
(v) daily force report hours,
(vi) timesheet hours,
(vii) swipe hours,
(viii) a percentage of total time covered by the presence of a plurality of personal wireless beacons
(ix) an average number of minutes from shift start to arriving at the one or more workface zones,
(x) an average number of minutes from leaving a last workface zone and leaving the worksite, and
(xi) average break length.

11. The method of claim 1, wherein the personal wireless beacon data further specifies a respective identity of an individual associated with each personal wireless beacon in the plurality of personal wireless beacons.

12. The method of claim 1, wherein the received request for a user interface presentation specifies a time period for the respective counts of individuals within the first area.

13. The method of claim 1, wherein the user interface presentation comprises graphical representations based on (i) the count of individuals within the first area, (ii) a total number of people at the worksite, (iii) a count of individuals within a second area designated as a non-productive area, (iv) data specifying an assigned amount of time to be spent by individuals within each of the first area and the second area, (v) data specifying budgeted hours per activity, and (vi) data specifying earned hours per activity.

14. The method of claim 1, wherein the generated user interface presentation comprises user-selectable filters that respectively filter the presentation according to (i) date, (ii) class, (iii) shift type, (iv) vendor, (v) role, and (vi) zone type.

15. The method of claim 1, wherein the generated user interface presentation comprises two user-selectable filters that filter the presentation according to (i) individuals who were planned to be within the first area based on a vendor report, and (ii) individuals who were not planned to be within the first area based on a vendor report, respectively.

16. The method of claim 1, wherein the generated user interface presentation comprises two user selectable buttons that presents the respective counts of individuals within the first area as (i) chart form and (ii) table form, respectively.

17. A system comprising:
one or more computers and one or more storage devices storing instructions that are operable, when executed by the one or more computers, to cause the one or more computers to perform operations comprising:
detecting, by a plurality of wireless access points of a location tracking system that includes (i) the plurality of wireless access points, (ii) a plurality of access control devices, (iii) a user interface generator, and (iv) an extract-transform-load engine, personal wireless beacon data from a plurality of personal wireless beacons that are located within a worksite, the personal wireless beacon data including data identifying, for each personal wireless beacon, a time of detection, a location of a respective detecting wireless access point, a detected wireless beacon, and a daily working schedule of an individual, wherein the personal wireless beacon is configured to associate with the individual and load the daily working schedule of the individual in response to communicating with a near field communication card that stores data identifying the individual and the daily working schedule of the individual while the personal wireless beacon is stored on a docking station;
detecting, by the plurality of access control devices of the location tracking system, access control data describing accesses granted by an access control system to individuals to a first area of the worksite designated as a productive area of the worksite;
receiving, by the user interface generator of the location tracking system, a request for a user interface presentation that presents (i) time spent by individuals in the first area of the worksite, (ii) a comparison between the personal wireless beacon data and the access control data, (iii) the personal wireless beacon data and the access control data, and (iv) the daily working schedules for the individuals associated with the personal wireless beacon data that is collected from the personal wireless beacons that are associated with the individuals and that load the daily working schedules of the individuals in response to communicating with near field communication cards that store the data identifying the individuals and the daily working schedules of the individuals while the personal wireless beacons are stored on docking stations;
generating, by the user interface generator of the location tracking system, the user interface presentation that presents (i) the time spent by individuals in the first area of the worksite, (ii) the comparison between the personal wireless beacon data and the access control data, (iii) the personal wireless beacon data and the access control data, and (iv) the daily working schedules for the individuals associated with the personal wireless beacon data that is collected from the personal wireless beacons that are associated with the individuals and that load the daily working schedules of the individuals in response to communicating with near field communication cards that store the data identifying the individuals and the daily working schedules of the individuals while the personal wireless beacons are stored on the docking stations;

receiving, by the user interface generator of the location tracking system and within the user interface presentation, user input selecting a filter that specifies a plurality of time periods;

computing, by the extract-transform-load engine of the location tracking system and for each of the plurality of time periods, a respective first count of individuals within the first area of the worksite according to respective locations in the personal wireless beacon data;

computing, by the extract-transform-load engine of the location tracking system and for each of the plurality of time periods, a respective second count of individuals within the first area of the worksite according to the access control data;

comparing, by the extract-transform-load engine of the location tracking system, the first count of individuals according to the personal wireless beacon data to the second count of individuals according to the access control data;

based on comparing the first count of individuals according to the personal wireless beacon data to the second count of individuals according to the access control data, determining, by the extract-transform-load engine of the location tracking system, that the personal wireless beacon data is inconsistent with the access control data;

in response to determining that the personal wireless beacon data is inconsistent with the access control data, determining, by the extract-transform-load engine of the location tracking system, an aggregate measure of individuals granted access by the access control system without having personal wireless beacons present within the worksite;

updating, by the user interface generator of the location tracking system, the user interface presentation that presents (i) the time spent by individuals in the first area of the worksite, (ii) the comparison between the personal wireless beacon data and the access control data, (iii) the personal wireless beacon data and the access control data, and (iv) the daily working schedules for the individuals associated with the personal wireless beacon data that is collected from the personal wireless beacons that are associated with the individuals and that load the daily working schedules of the individuals in response to communicating with near field communication cards that store the data identifying the individuals and the daily working schedules of the individuals while the personal wireless beacons are stored on the docking stations, to present the respective counts of individuals within the first area, the aggregate measure of individuals granted access by the access control system without having personal wireless beacons present within the worksite, and the personal wireless beacon data and the access control data over each of the plurality of time periods; and providing, by the user interface generator of the location tracking system, the generated user interface presentation in response to the request.

* * * * *

UNITED STATES PATENT AND TRADEMARK OFFICE
CERTIFICATE OF CORRECTION

PATENT NO. : 10,346,807 B2
APPLICATION NO. : 15/043966
DATED : July 9, 2019
INVENTOR(S) : Scott Tvaroh and Rajesh Ramamurthi It is certified that error appears in the above-identified patent and that said Letters Patent is hereby corrected as shown below:

In the Claims

In Claim 10, Column 29, Line 34, after "beacons" insert -- , --.

Signed and Sealed this
Tenth Day of September, 2019

Andrei Iancu
*Director of the United States Patent and Trademark Office*